United States Patent
Wang et al.

(10) Patent No.: US 11,910,382 B2
(45) Date of Patent: Feb. 20, 2024

(54) METHOD OF TRANSMITTING PHYSICAL UPLINK CONTROL CHANNEL AND RELATED DEVICE

(71) Applicant: FG Innovation Company Limited, Tuen Mun (HK)

(72) Inventors: Hai-Han Wang, Taipei (TW); Wan-Chen Lin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 96 days.

(21) Appl. No.: 17/508,378

(22) Filed: Oct. 22, 2021

(65) Prior Publication Data

US 2022/0132537 A1    Apr. 28, 2022

Related U.S. Application Data

(60) Provisional application No. 63/104,925, filed on Oct. 23, 2020.

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0061* (2013.01); *H04L 1/1819* (2013.01); *H04L 5/0053* (2013.01); *H04W 72/23* (2023.01)

(58) Field of Classification Search
CPC ............. H04W 72/30; H04W 72/0446; H04W 72/0453; H04L 1/1812; H04L 5/0053;
(Continued)

(56) References Cited

U.S. PATENT DOCUMENTS

2021/0250134 A1\* 8/2021 Islam ................. H04L 1/1819
2021/0266941 A1\* 8/2021 Park ................... H04L 5/0053

FOREIGN PATENT DOCUMENTS

CN        111800864       10/2020
WO        2020197338      10/2020

OTHER PUBLICATIONS

3GPP TS 38.214, "3rd Generation Partnership Project; Technical Specification Group Radio Access Network; NR; Physical layer procedures for data (Release 16)", V16.3.0 (Sep. 2020).

(Continued)

*Primary Examiner* — Charles C Jiang
*Assistant Examiner* — Shawn D Miller
(74) *Attorney, Agent, or Firm* — ScienBiziP, P.C.

(57) ABSTRACT

A method of transmitting a Physical Uplink Control Channel (PUCCH) for a user equipment (UE) is provided. The method includes receiving a first Radio Resource Control (RRC) configuration including a first PUCCH resource configuration and a second PUCCH resource configuration, receiving a first Downlink Control Information (DCI) format that schedules a first Physical Downlink Shared Channel (PDSCH) and a second DCI format that schedules a second PDSCH, determining a first PUCCH for a first Hybrid Automatic Repeat reQuest (HARQ) acknowledgement (ACK) codebook corresponding to the first PDSCH according to the first PUCCH resource configuration, determining a second PUCCH for a second HARQ-ACK codebook corresponding to the second PDSCH according to the second PUCCH resource configuration, and transmitting the first PUCCH when the first PUCCH overlaps the second PUCCH in a time domain, the first HARQ-ACK codebook and the second HARQ-ACK codebook multiplexed in the first PUCCH.

8 Claims, 6 Drawing Sheets

(51) Int. Cl.
*H04L 1/1812* (2023.01)
*H04L 5/00* (2006.01)
*H04W 72/23* (2023.01)

(58) Field of Classification Search
CPC ... H04L 1/1822; H04L 1/1896; H04L 1/1861; H04L 2001/0093; H04L 1/0027; H04L 1/1806

See application file for complete search history.

(56) References Cited

OTHER PUBLICATIONS

3GPP TS 38.212, "3rd Generation Partnership Project; Technical Specification Group Radio Access Network; NR; Multiplexing and channel coding (Release 16)", V16.3.0 (Sep. 2020).

3GPP TS 38.213, "3rd Generation Partnership Project; Technical Specification Group Radio Access Network; NR; Physical layer procedures for control (Release 16)", V16.3.0 (Sep. 2020).

CATT, Correction for UCI on Msg3 PUSCH and MsgA PUSCH, 3GPP TSG-RAN WG1 #103-e, e-Meeting, Oct. 26-Nov. 13, 2020, R1-2007802, p. 3-p. 5.

* cited by examiner

METHOD OF TRANSMITTING PHYSICAL UPLINK CONTROL CHANNEL AND RELATED DEVICE

CROSS-REFERENCE TO RELATED APPLICATION(S)

The present disclosure claims the benefit of and priority to U.S. Provisional Patent Application Ser. No. 63/104,925, filed on Oct. 23, 2020, entitled "MULTIPLEXING UPLINK CHANNELS OF DIFFERENT PRIORITIES," (hereinafter referred to as "the '925 provisional"). The disclosure of the '925 provisional is hereby incorporated herein fully by reference into the present disclosure.

FIELD

The present disclosure is generally related to wireless communications and more specifically, to a method of transmitting a physical uplink control channel (PUCCH) and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of transmitting a Physical Uplink Control Channel (PUCCH) and a related device.

According to an aspect of the present disclosure, a method of transmitting a PUCCH for a user equipment (UE) is provided. The method includes receiving a first Radio Resource Control (RRC) configuration including a first PUCCH resource configuration and a second PUCCH resource configuration, receiving a first Downlink Control Information (DCI) format that schedules a first Physical Downlink Shared Channel (PDSCH) and a second DCI format that schedules a second PDSCH, determining a first PUCCH for a first Hybrid Automatic Repeat reQuest (HARQ) acknowledgement (ACK) codebook corresponding to the first PDSCH according to the first PUCCH resource configuration, determining a second PUCCH for a second HARQ-ACK codebook corresponding to the second PDSCH according to the second PUCCH resource configuration, transmitting the first PUCCH when the first PUCCH overlaps the second PUCCH in a time domain, the first HARQ-ACK codebook and the second HARQ-ACK codebook multiplexed in the first PUCCH, determining a first number of resource elements in the first PUCCH for the first HARQ-ACK codebook according to a smaller of a total number of resource elements of the first PUCCH and a second number of resource elements, the second number determined based on at least one of a payload size of the first HARQ-ACK codebook, a size of a Cyclic Redundancy Check (CRC) for the first HARQ-ACK codebook, and a first maximum coding rate corresponding to the first PUCCH resource configuration, and determining a third number of resource elements in the first PUCCH for the second HARQ-ACK codebook according to a difference between the total number of resource elements of the first PUCCH and the first number of resource elements for the first HARQ-ACK codebook.

According to another aspect of the present disclosure, a UE for transmitting a PUCCH is provided. The UE includes a processor configured to execute a computer-executable program, and a memory coupled to the processor and configured to store the computer-executable program, wherein the computer-executable program instructs the processor to perform the above-disclosed method of transmitting a PUCCH.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
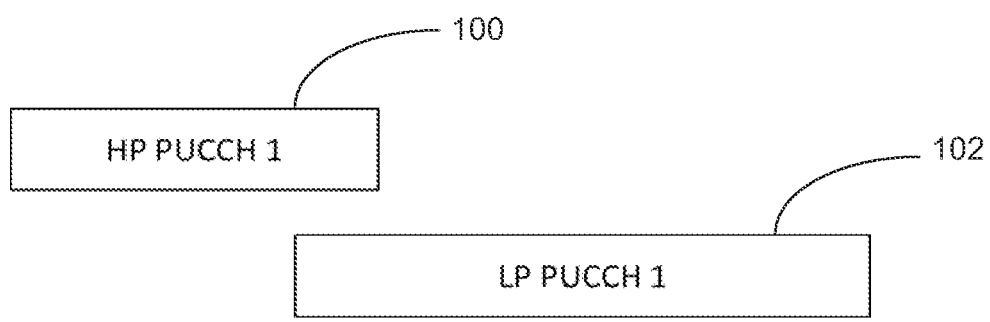
FIG. 1 is a schematic diagram illustrating a high priority Physical Uplink Control Channel (PUCCH) overlapping a low priority PUCCH, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

In NR system, multiple types of services may be supported in a cell, each with different latency and reliability requirements. When a UE has both eMBB and URLLC traffics, physical uplink shared channel (PUSCH) or physical uplink control channel (PUCCH) transmission for eMBB traffic may collide PUSCH transmission for URLLC traffic. In this situation, to guarantee latency requirement for URLLC traffic is met, PUSCH or PUCCH transmission for eMBB traffic may be cancelled for the UE to transmit a PUSCH for URLLC traffic. If a PUCCH transmission carrying hybrid automatic repeat request (HARQ) acknowledgement (ACK) is cancelled, the gNB needs to re-schedule the physical downlink shared channel (PDSCH) corresponding to the PUCCH transmission, which may impact the system capacity since the PDSCH re-scheduling may consume a large amount of radio resource. Therefore, a mechanism for multiplexing HARQ-ACKs for eMBB traffic in a high priority UL channel (e.g., the PUSCH) for URLLC traffic is required in NR system when the PUSCH for URLLC traffic overlaps the low priority PUCCH carrying HARQ-ACKs for eMBB traffic.

In the 3GPP Rel-16, the UE may be configured with 2 HARQ-ACK codebooks. If the UE is configured with pdsch-HARQ-ACK-Codebook-List, the UE may generate one or two HARQ-ACK codebooks according to pdsch-HARQ-ACK-Codebook-List. When the UE generates one HARQ-ACK codebook, the HARQ-ACK codebook is associated with a PUCCH of priority index 0. The UE multiplexes only HARQ-ACK information associated with a same priority index (e.g., priority index 0) in the HARQ-ACK codebook.

When the UE generates two HARQ-ACK codebooks, a first HARQ-ACK codebook is associated with a PUCCH of priority index 0 (e.g., low priority) and a second HARQ-ACK codebook is associated with a PUCCH of priority index 1 (e.g., high priority).

The UE is configured with the first and second HARQ-ACK codebooks for each of {PUCCH-Config, UCI-On-PUSCH, PDSCH-codeBlockGroupTransmission} by {PUCCHConfigurationList, UCI-OnPUSCH-List, PDSCH-CodeBlockGroupTransmission-List}, respectively.

In the 3GPP Rel-16, due to the introduction of intra-UE prioritization, a low priority HARQ-ACK PUCCH may be cancelled if the UE is scheduled with a high priority PUSCH or PUCCH that overlaps the low priority HARQ-ACK PUCCH. Thus, a low priority HARQ-ACK codebook multiplexed in a low priority PUSCH is cancelled when the low priority PUSCH overlaps the high priority PUCCH.

To increase spectral efficiency, mechanisms for multiplexing a low priority HARQ-ACK codebook of a low priority PUCCH, and a high priority HARQ-ACK codebook and a high priority Scheduling Request (SR) of a high priority PUCCH in a PUCCH, are necessary when the PUCCHs are overlapped. In addition, it is also beneficial to consider mechanisms for multiplexing a low priority HARQ-ACK codebook of a low priority PUCCH, and a high priority HARQ-ACK codebook and a high priority SR of a high priority PUCCH in a low priority PUSCH or in a high priority PUSCH when the PUCCHs overlap the low priority PUSCH or the high priority PUSCH.

I. Multiplexing PUCCHs of Different Priorities on a PUCCH

When the high priority PUCCHs overlap the low priority PUCCHs, the UE needs to determine a PUCCH in which the high priority uplink control information (UCI) and low priority UCI are multiplexed. To avoid dropping the low priority UCIs without jeopardizing the latency and reliability requirements of the high priority UCIs, a high priority PUCCH may be chosen. A method for determining a PUCCH resource for multiplexing the high priority UCIs and the low priority UCIs is required. To guarantee the reliability of the high priority UCIs and low priority UCIs, some conditions may be considered to determine the applicability of multiplexing low priority UCIs in the high priority PUCCH. Further, rate matching methods for multiplexing the high priority UCIs and the low priority UCIs are required.

II. Multiplexing PUCCHs and PUSCH of Different Priorities

When the high priority PUCCHs and the low priority PUCCHs overlap the low priority PUSCH, to guarantee the reliability of the high priority UCIs and low priority UCIs, some conditions may be considered to determine the applicability of multiplexing the high priority UCIs and the low priority UCIs in the low priority PUSCH. In addition, a rate matching method and resource mapping method for multiplexing the high priority UCIs and the low priority UCIs are required.

When the high priority PUCCHs and the low priority PUCCHs overlap the high priority PUSCH, to guarantee the reliability of high priority UCIs and low priority UCIs, some conditions may be considered to determine the applicability of multiplexing the high priority UCIs and the low priority UCIs in the high priority PUSCH. In addition, a rate matching method and resource mapping method for multiplexing the high priority UCIs and the low priority UCIs are also required.

Multiplexing PUCCHs of Different Priorities on a PUCCH

Figure 2:
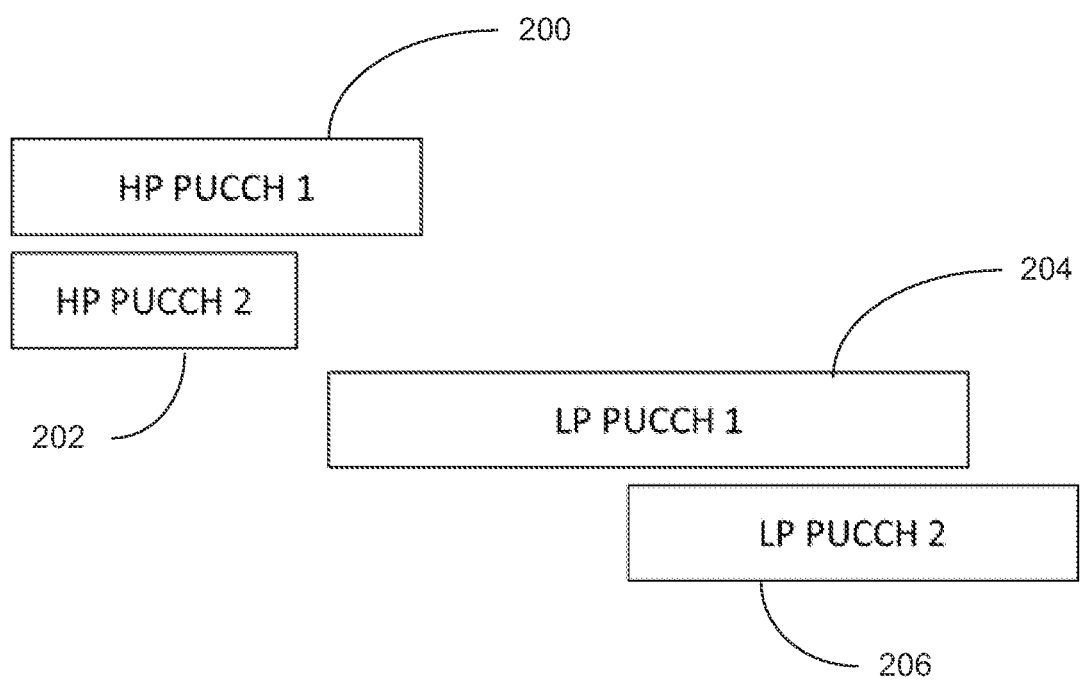
FIG. 2 is a schematic diagram illustrating a high priority PUCCH overlapping a high priority PUCCH and a low priority PUCCH overlapping a low priority PUCCH, according to an implementation of the present disclosure.

Methods of multiplexing UCI(s) of the low priority PUCCH in the high priority PUCCH when the high priority PUCCH overlaps the low priority PUCCH in a time domain are disclosed. It is noted that "a high priority PUCCH" and "a low priority PUCCH" disclosed herein may refer to a PUCCH carrying multiplexed UCI(s) determined according to the UCI multiplexing procedure specified in Clause 9.2.5 of the 3GPP TS 38.213 V16.3.0, for a group of high priority PUCCHs and for a group of low priority PUCCHs. FIG. 1 is a schematic diagram illustrating a high priority PUCCH overlapping a low priority PUCCH, according to an implementation of the present disclosure. For example, when the high priority PUCCH 100 (e.g., HP PUCCH 1) overlaps the low priority PUCCH 102 (e.g., LP PUCCH 1) as illustrated in FIG. 1, the high priority PUCCH 100 and the low priority PUCCH 102 in the following methods may refer to, respectively, HP PUCCH 1 and LP PUCCH 1. In addition, a high priority UCI and a low priority UCI in the following methods may refer to, respectively, the UCI associated with the HP PUCCH 1 and the UCI associated with the LP PUCCH 1. FIG. 2 is a schematic diagram illustrating a high priority PUCCH overlapping a high priority PUCCH and a low priority PUCCH overlapping a low priority PUCCH, according to an implementation of the present disclosure. For example, the high priority PUCCH 200 (e.g., HP PUCCH 1) may overlap the high priority PUCCH 202 (e.g., HP PUCCH 2), and the low priority PUCCH 204 (e.g., LP PUCCH 1) may overlap the low priority PUCCH 206 (e.g., LP PUCCH 2) as illustrated in FIG. 2. The UE may first determine to multiplex the UCI associated with the HP PUCCH 1 and the UCI associated with the HP PUCCH 2 in the HP PUCCH 1, and multiplex the UCI associated with the LP PUCCH 1 and the UCI associated with the LP PUCCH 2 in the LP PUCCH 1. The remaining PUCCHs include the HP PUCCH 1 (e.g., the high priority PUCCH 200) and the LP PUCCH 1 (e.g., the low priority PUCCH 204), where the HP PUCCH 1 overlaps the LP PUCCH 1. The high priority PUCCH and the low priority PUCCH in the following methods may refer to, respectively, the HP PUCCH 1 and the LP PUCCH 1. The high priority UCI and the low priority UCI in the following methods may refer to, respectively, the UCI multiplexed in the HP PUCCH 1 and the UCI multiplexed in the LP PUCCH 1.

Method 1: When the high priority PUCCH overlaps the low priority PUCCH in a time domain, the UE may multiplex a UCI of the low priority PUCCH in the high priority PUCCH when one or more of the following conditions are met:

Condition 1. Timeline requirements for UCI multiplexing is satisfied for the high priority PUCCH and the low priority PUCCH.

Condition 2. Channel State Information (CSI) is not included in the high priority PUCCH;

Condition 3. CSI part 2 is not included in the high priority PUCCH.

Condition 4. The high priority PUCCH is the PUCCH format 2, the PUCCH format 3, or the PUCCH format 4.

Condition 5. The high priority PUCCH is the short PUCCH format.

Condition 6. PUCCHs with different priorities may use different PUCCH formats (e.g., the high priority PUCCH uses the short PUCCH, and the low priority PUCCH uses the long PUCCH).

Condition 7. The high priority PUCCH is scheduled by a DCI format. The DCI format may be referred to as the DCI format 1_0, the DCI format 1_1, or the DCI format 1_2.

Condition 8. The high priority PUCCH is not a PUCCH resource configured in an 'SPS-Config' IE.

Condition 9. The high priority PUCCH is not a PUCCH resource configured in an 'sps-PUCCH-AN-List-r16' IE.

Condition 10. The UE is provided with the capability of multiplexing the high priority UCIs and the low priority UCIs.

Condition 11. A gNB configures the UE to multiplex the high priority UCIs and the low priority UCIs.

Condition 12. The DCI format informs the UE to multiplex the high priority UCIs and the low priority UCIs.

Condition 13. The high priority PUCCH is configured by the 'PUCCH-Config' IE including the 'subslotLengthForPUCCH-r16' IE.

Condition 14. The high priority PUCCH is configured by the 'PUCCH-Config' IE including the 'dl-DataToUL-ACK-r16' IE.

Condition 15. The high priority PUCCH is a PUCCH format configured for multiplexing the low priority UCIs. An IE may be included in the 'PUCCH-FormatConfig' IE for the PUCCH format in the second 'PUCCH-Config' IE to indicate the applicability of the PUCCH format for multiplexing.

Condition 16. The number of multiplexed high priority UCI bits $O_{HP\_UCI}$ plus the number of low priority UCI bits $O_{LP\_UCI}$ does not exceed the maxPayloadSize of the PUCCH resource set in which the high priority PUCCH is selected, when the high priority PUCCH is a PUCCH for HARQ-ACK. In some examples, $O_{LP\_UCI}$ may be scaled by a predefined or preconfigured scaling factor (e.g., the ratio of the maxPayloadSize of the high priority PUCCH to the maxPayloadSize of the low priority PUCCH of the same PUCCH format).

Condition 17. The number of PRBs of the high priority PUCCH that is determined for high priority UCIs is less than $M_{RB}^{PUCCH}$ PRBs, where $M_{RB}^{PUCCH}$ is the maximum number of physical resource blocks (PRBs) configured by the 'nrofPRBs' IE for the PUCCH format of the high priority PUCCH.

Condition 18. The number of resource elements in the high priority PUCCH available for the low priority UCI bits results in a code rate of the low priority UCIs that is higher than a threshold. The threshold may be determined based on the preconfigured values or values indicated via the DCI format.

Condition 19. The UE may multiplex the low priority HARQ-ACK codebook in the high priority PUCCH when one or more of the following conditions are met:

Condition 19a. The size of the low priority HARQ-ACK codebook is not larger than the number of bits that is preconfigured.

Condition 19b. The low priority HARQ-ACK codebook is the Type 1 HARQ-ACK codebook;

Condition 19c. The low priority HARQ-ACK codebook is the Type 1 HARQ-ACK codebook. The UE transmits HARQ-ACK information in the low priority PUCCH only for a Semi Persistent Scheduling (SPS) PDSCH release indicated by the DCI format 1_0 with the counter DAI field value of 1, only for a PDSCH reception scheduled by the DCI format 1_0 with the counter DAI field value of 1 on the PCell, or only for SPS PDSCH reception(s) within the $M_{A,c}$ occasions for candidate PDSCH receptions as determined in Clause 9.1.2.1 in the 3GPP TS 38.213.

Condition 19d. The low priority HARQ-ACK codebook includes only a transport block (TB)-based sub-codebook.

Condition 19e. The 'PDSCH-CodeBlockGroupTransmission' IE is not provided for the low priority HARQ-ACK codebook.

Condition 20. The UE may multiplex the low priority SR in the high priority PUCCH when one or more of the following conditions are met:

Condition 20a. The size of the low priority SR is not larger than the number of bits that is preconfigured.

Condition 20b. The low priority HARQ-ACK codebook is multiplexed with the low priority SR in the low priority PUCCH, and the size of the low priority HARQ-ACK codebook plus the size of the low priority SR is not larger than the number of bits that is preconfigured.

Condition 21. The UE may multiplex the low priority CSI in the high priority PUCCH when one or more of the following conditions are met:

Condition 21a. The low priority CSI includes only CSI part 1.

Condition 21b. The size of the low priority CSI is not larger than the number of bits that are preconfigured.

Condition 21c. The low priority HARQ-ACK codebook is multiplexed with the low priority CSI in the low priority PUCCH, and the size of the low priority HARQ-ACK codebook plus the size of the low priority CSI is not larger than the number of bits that are preconfigured.

The following method may be used for determining a PUCCH resource for the high priority PUCCH when the high priority PUCCH overlaps the low priority PUCCH in a time domain.

Method 2: When the high priority PUCCH is the dynamically-scheduled PUCCH resource for the high priority HARQ-ACK codebook, the UE may select a PUCCH resource set based on the total payload size of the high priority UCIs in the high priority PUCCH, and a PUCCH resource indicator (PRI) in the DCI format that schedules the high priority PUCCH is used to select the high priority PUCCH from the PUCCH resources in the selected PUCCH resource set. For example, based on the total payload size $O_{HP\_UCI}$ that is determined according to the UCI multiplexing procedure specified in Clause 9.2.5 of the 3GPP TS 38.213 V16.3.0, for the high priority PUCCH, the PUCCH resource set may be selected as follows. If the UE transmits $O_{HP\_UCI}$ UCI information bits that include HARQ-ACK information bits, the UE determines the PUCCH resource set to be:

- a first set of PUCCH resources with pucch-ResourceSetId=0 if $O_{HP\_UCI} \leq 2$ including 1 or 2 HARQ-ACK information bits and a positive or negative SR on an SR transmission occasion if the transmission of the HARQ-ACK information and SR occurs simultaneously, or
- a second set of PUCCH resources with pucch-ResourceSetId=1, which is provided by a higher layer, if $2 \leq O_{HP\_UCI} \leq N_2$ where $N_2$ is equal to maxPayloadSize if maxPayloadSize is provided for the PUCCH resource set with pucch-ResourceSetId=1; otherwise $N_2$ is equal to 1706, or
- a third set of PUCCH resources with pucch-ResourceSetId=2, which is provided by a higher layer, if $N_2 \leq O_{HP\_UCI} \leq N_3$ where $N_3$ is equal to maxPayloadSize if maxPayloadSize is provided for the PUCCH resource set with pucch-ResourceSetId=2; otherwise $N_3$ is equal to 1706, or
- a fourth set of PUCCH resources with pucch-ResourceSetId=3, which is provided by a higher layer, if $N_3 \leq O_{HP\_UCI} \leq 1706$.

After the PUCCH resource is selected, the number of PRBs for the PUCCH resource is determined based on one or more of the following parameters: the total payload size of the high priority UCIs $O_{HP\_UCI}$, the total payload size of the low priority UCIs in the low priority PUCCH that is multiplexed in the high priority PUCCH, the maxCodeRate of the high priority PUCCH, and the maxCodeRate of the low priority PUCCH. It is noted that the low priority PUCCH may be a PUCCH carrying low priority UCIs, and the UE may perform the UCI multiplexing procedure specified in Clause 9.2.5 of the 3GPP TS 38.213 V16.3.0 on a group of low priority PUCCHs. It is noted that multiplexing of the low priority UCIs in the high priority PUCCH may be performed based on the Method 1 and the methods disclosed below.

In some implementations, if $(O_{HP\_ACK}+O_{HP}+O_{HP\_CRC}+O_{LP\_ACK}+O_{LP\_CRC}) \leq M_{RB}^{PUCCH} \cdot N_{sc,ctrl}^{RB} \cdot N_{symb-UCI}^{PUCCH} \cdot Q_m \cdot r_{HP}$, the UE transmits the high priority HARQ-ACK codebook, high priority SR, and low priority HARQ-ACK codebook by selecting the minimum number $M_{RB,min}^{PUCCH}$ of the $M_{RB}^{PUCCH}$ PRBs satisfying $(O_{HP\_ACK}+O_{HP\_SR}+O_{HP\_CRC}+O_{LP\_ACK}+O_{LP\_CRC}) \leq M_{RB,min}^{PUCCH} \cdot N_{sc,ctrl}^{RB} \cdot N_{symb-UCI}^{PUCCH} \cdot Q_m \cdot r_{HP}$ and if $M_{RB}^{PUCCH} > 1$, $(O_{HP\_ACK}+O_{HP\_SR}+O_{HP\_CRC}+O_{LP\_ACK}+O_{LP\_CRC}) > (M_{RB,min}^{PUCCH}-1) \cdot N_{sc,ctrl}^{RB} \cdot N_{symb-UCI}^{PUCCH} \cdot Q_m \cdot r_{HP}$,
where $M_{RB}^{PUCCH}$ is the maximum number of PRBs configured by nrofPRBs of the PUCCH format of the high priority PUCCH, $r_{HP}$ is the maxCodeRate of the PUCCH format of the high priority PUCCH configured in the second PUCCH-Config, and $N_{sc,ctrl}^{RB}$, $N_{symb-UCI}^{PUCCH}$, and $Q_m$ are as defined in the 3GPP TS 38.213 V16.3.0. if $(O_{HP\_ACK}+O_{HP\_SR}+O_{HP\_CRC}+O_{LP\_ACK}+O_{LP\_CRC}) > M_{RB}^{PUCCH}$, $N_{sc,ctrl}^{RB} \cdot N_{symb-UCI}^{PUCCH} \cdot Q_m \cdot r_{HP}$, the UE transmits the high priority HARQ-ACK codebook, the high priority SR, and the low priority HARQ-ACK codebook (if determined for multiplexing) in $M_{RB}^{PUCCH}$ PRBs.

In some implementations, if $(O_{HP\_ACK}+O_{HP}+O_{HP\_CRC}+O_{LP\_ACK}+O_{LP\_CRC}) \leq M_{RB}^{PUCCH} \cdot N_{sc,ctrl}^{RB} \cdot N_{symb-UCI}^{PUCCH} \cdot Q_m \cdot r_{HP}$, the UE transmits the high priority HARQ-ACK codebook, the high priority SR, and the low priority HARQ-ACK codebook by selecting the minimum number $M_{RB,min}^{PUCCH}$ of the $M_{RB}^{PUCCH}$ PRBs satisfying $(O_{HP\_ACK}+O_{HP\_SR}+O_{HP\_CRC}+O_{LP\_ACK}+O_{LP\_CRC}) \cdot X) \leq M_{RB,min}^{PUCCH} \cdot N_{sc,ctrl}^{RB} \cdot N_{symb-UCI}^{PUCCH} \cdot Q_m \cdot r_{HP}$ and if $M_{RB}^{PUCCH} > 1$, $(O_{HP\_ACK}+O_{HP\_SR}+O_{HP\_CRC}+O_{LP\_ACK}+O_{LP\_CRC}) \cdot X) > (M_{RB,min}^{PUCCH}-1) \cdot N_{sc,ctrl}^{RB} \cdot N_{symb-UCI}^{PUCCH} \cdot Q_m \cdot r_{HP}$, where X may be a predefined or preconfigured value, such as $$X = \frac{r_{HP}}{r_{LP}},$$

where $r_{LP}$ is the maxCodeRate of the PUCCH format of the low priority PUCCH configured in the first PUCCH-Config or the maxCodeRate of the PUCCH format of the high priority PUCCH that is configured in the first PUCCH-Config. The preconfigured or predefined value may be assumed for $r_{LP}$ when the low priority PUCCH is PUCCH format 0 or PUCCH format 1, such as $r_{LP}=0.8$.

The following method may be used to determine the number of available resource elements and a threshold of the number of available resource elements for multiplexing the low priority UCIs in the high priority PUCCH.

Method 3: When the high priority PUCCH and the low priority PUCCH overlap, the UE may perform the rate matching for the UCIs of the high priority PUCCH for multiplexing in the high priority PUCCH based on the maxCodeRate of the PUCCH format of the high priority PUCCH that is configured in the second PUCCH-Config, denoted as $r_{HP}$. For example, the number of resource elements for multiplexing the high priority HARQ-ACK codebook may be calculated according to the equation:

$$E_{HP\ UCI} = \min\left\{E_{tot,HP}, \left\lceil \frac{(O_{HP\ ACK} + O_{HP\ SR} + L_{HP\ UCI})}{r_{HP} \cdot Q_m} \right\rceil\right\},$$

where $O_{HP\ ACK}$ is the payload size of the high priority HARQ-ACK codebook, $O_{HP\ SR}$ is the payload size of the high priority SR, and $L_{HP\ UCI}$ is the size of the Cyclic Redundancy Check (CRC) of the high priority UCIs, and $E_{tot,HP}$ is the total number of resource elements of the high priority PUCCH resource.

In some implementations, $O_{HP\ CSI-1}$ bits of the high priority CSI part 1 may be included in the high priority UCIs. The remaining number of resource elements available for multiplexing low priority UCIs in the high priority PUCCH may be determined as $E_{tot,HP} - E_{HP\ UCI}$. The UE may determine whether to multiplex the low priority HARQ-ACK codebook in the high priority PUCCH according to a minimum number of resource elements that are calculated according to the equation:

$$E_{LP\ UCI,min} = \min\left\{E_{tot,LP}, \left\lceil \frac{(O_{LP\ ACK} + L_{LP\ UCI})}{r_{LP} \cdot Q_m} \right\rceil\right\},$$

where $O_{LP\ ACK}$ is the payload size of the low priority HARQ-ACK codebook, $L_{LP\ UCI}$ is the size of the CRC of the low priority UCIs, $r_{LP}$ is the maxCodeRate of the PUCCH format of the low priority PUCCH configured in the first PUCCH-Config or the maxCodeRate of the PUCCH format of the high priority PUCCH configured in the first PUCCH-Config, and $E_{tot,LP}$ is the total number of resource elements of the low priority PUCCH resource. In some implementations, $O_{LP\ SR}$ bits of low priority SR may also be included in the low priority UCIs. In some implementations, $$E_{LP\ UCI,min} = \left\lceil \frac{(O_{LP\ ACK} + L_{LP\ UCI})}{r_{LP} \cdot Q_m} \right\rceil.$$

Therefore, if $E_{LP\ UCI,min}$ is larger than $E_{tot,HP} - E_{HP\ UCI}$, the UE does not multiplex the low priority HARQ-ACK codebook in the high priority PUCCH.

In some implementations, when the number of resource elements is not enough for multiplexing the low priority HARQ-ACK codebook in the high priority PUCCH, the low priority HARQ-ACK codebook may be compressed according to the methods for HARQ-ACK codebook compression disclosed below.

In some implementations, when the number of resource elements is not enough for multiplexing the low priority HARQ-ACK codebook, the UE may omit the HARQ-ACK bits in the low priority HARQ-ACK codebook corresponding to dynamically-scheduled PDSCH receptions. Alternatively, the UE may omit the HARQ-ACK bits in the low priority HARQ-ACK codebook corresponding to SPS PDSCH receptions.

The following method may be used to compress the size of the low priority HARQ-ACK codebook for multiplexing in the high priority PUCCH.

Method 4: Spatial bundling parameters and Code block group (CBG) parameters may be separately configured for the low priority HARQ-ACK codebook for multiplexing in the high priority PUCCH and for the low priority HARQ-ACK codebook for multiplexing in the low priority PUCCH.

In some implementations, harq-ACK-SpatialBundling-HPPUCCH may be configured in PhysicalCellGroupConfig to instruct the UE to perform the spatial bundling for the low priority HARQ-ACK codebook and/or the high priority HARQ-ACK codebook when the UE multiplexes the low priority HARQ-ACK codebook and/or the high priority HARQ-ACK codebook in the high priority PUCCH. In some implementations, harq-ACK-SpatialBundlingPUCCH may be configured in PhysicalCellGroupConfig to instruct the UE to perform the spatial bundling for the low priority HARQ-ACK codebook when the UE multiplexes the low priority HARQ-ACK codebook in the low priority PUCCH. In some implementations, when harq-ACK-Spatial-BundlingPUCCH is configured, the UE performs the spatial bundling for the low priority HARQ-ACK codebook when the UE multiplexes the low priority HARQ-ACK codebook in the high priority PUCCH.

In some implementations, harq-ACK-TBHPPUCCH may be configured in PhysicalCellGroupConfig or in PUCCH-Config to indicate that the CBG based HARQ-ACK codebook is compressed. In some implementations, if the low priority HARQ-ACK codebook is the Type-1 HARQ-ACK codebook, the UE transmits only HARQ-ACK bits for the transport blocks (TBs) in the PDSCHs corresponding to the low priority HARQ-ACK codebook when the UE multiplexes the low priority HARQ-ACK codebook in the high priority PUCCH. In some implementations, if the low priority HARQ-ACK codebook is the Type-2 HARQ-ACK codebook, the UE transmits only the TB-based sub-codebook of the low priority HARQ-ACK codebook when the UE multiplexes the low priority HARQ-ACK codebook in the high priority PUCCH. In some implementations, if the low priority HARQ-ACK codebook is the Type-2 HARQ-ACK codebook, the UE transmits the TB-based sub-codebook of the low priority HARQ-ACK codebook, and the HARQ-ACK bits for the TBs in the PDSCHs corresponding to the CBG based sub-codebook of the low priority HARQ-ACK codebook when the UE multiplexes the low priority HARQ-ACK codebook in the high priority PUCCH.

Multiplexing PUCCHs and PUSCH of Different Priorities

Figure 3:
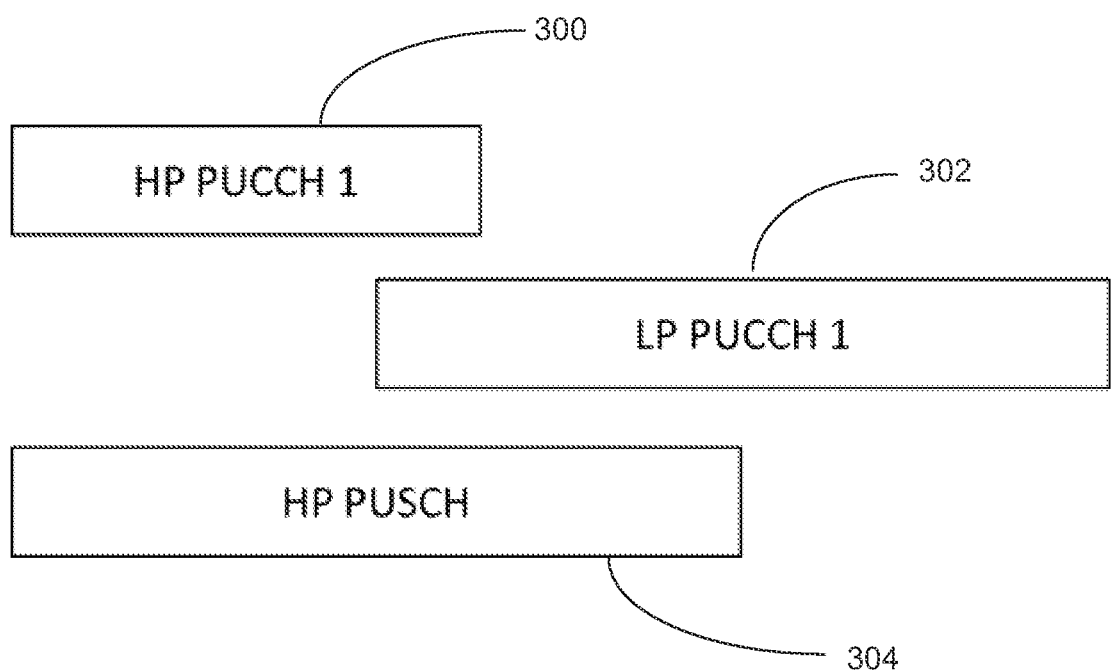
FIG. 3 is a schematic diagram illustrating a low priority PUCCH and a high priority PUCCH overlapping a high priority Physical Uplink Shared Channel (PUSCH), according to an implementation of the present disclosure.
Figure 4:
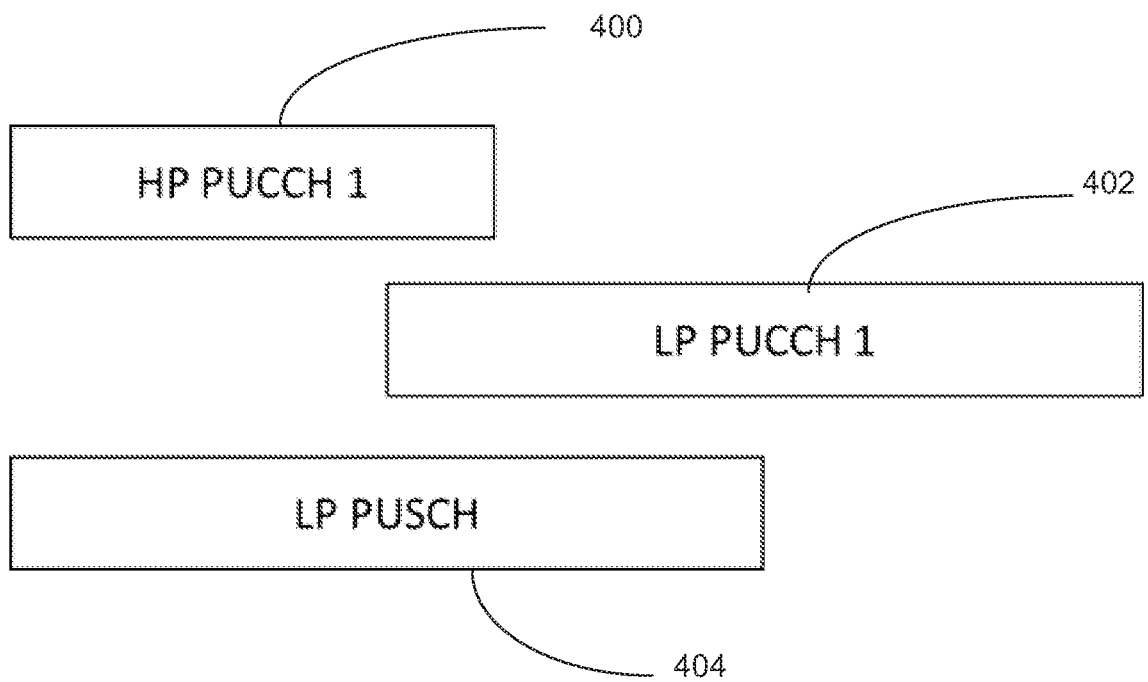
FIG. 4 is a schematic diagram illustrating a low priority PUCCH and a high priority PUCCH overlapping a low priority PUSCH, according to an implementation of the present disclosure.

FIG. 3 is a schematic diagram illustrating a low priority PUCCH and a high priority PUCCH overlapping a high priority PUSCH, according to an implementation of the present disclosure. FIG. 4 is a schematic diagram illustrating a low priority PUCCH and a high priority PUCCH overlapping a low priority PUSCH, according to an implementation of the present disclosure. According to FIG. 3 and FIG. 4, the following method may be used to configure or indicate beta offsets and scaling factors for multiplexing the low priority UCIs and the high priority UCIs in a PUSCH when the low priority PUCCH 302 or low priority PUCCH 402 (e.g., LP PUCCH 1) associated with the low priority UCIs and the high priority PUCCH 300 or high priority PUCCH 400 (e.g., HP PUCCH 1) associated with the high priority UCIs overlaps the PUSCH in time domain. The PUSCH may be a high priority PUSCH (e.g., HP PUSCH 304) as illustrated in FIG. 3 or the PUSCH may be a low priority PUSCH (e.g., LP PUSCH 404) as illustrated in FIG. 4. The priority of the PUSCH may be indicated by the priority indicator in the DCI format that schedules the PUSCH.

It is noted that "the high priority PUCCH" and "the low priority PUCCH" disclosed in the following may refer to a PUCCH carrying multiplexed UCI(s) determined according to the UCI multiplexing procedure specified in Clause 9.2.5 in the 3GPP TS 38.213 V16.3.0, for a group of high priority PUCCHs and for a group of low priority PUCCHs, respectively.

Method 5: Beta offsets and scaling factors may be configured specifically for UCIs of a first priority (e.g., the high priority) when the UE multiplexes the UCI of the first priority in a PUSCH of a second priority (e.g., the low priority). In some implementations, the first priority and the second priority may be the same or different.

In some implementations, LPUCI-OnHPPUSCH and HPUCI-OnHPPUSCH are used to configure beta offsets and scaling factors for UCIs of, respectively, the low priority and UCIs of the high priority when the UE multiplexes the UCIs in a PUSCH of the high priority. For example, $\beta_{offset}^{LP\ HARQ-ACK,HP\ PUSCH}$, $\beta_{offset}^{LP\ CSI-1,HP\ PUSCH}$, $\beta_{offset}^{LP\ CSI-2,HP\ PUSCH}$, and $\alpha_{HP-PUSCH}^{LP}$ may be configured in LPUCI-OnHPPUSCH, and $\beta_{offset}^{HP\ HARQ-ACK,HP\ PUSCH}$, $\beta_{offset}^{HP\ CSI-1,HP\ PUSCH}$, $\beta_{offset}^{HP\ CSI-2,HP\ PUSCH}$, and $\alpha_{HP-PUSCH}^{HP}$ may be configured in HPUCI-OnHPPUSCH. In addition, a beta_offset indicator (e.g., a value of the DCI field) for UCIs of the low priority may be included in a DCI format that schedules the high priority PUSCH when dynamic beta offsets are configured in LPUCI-OnHP-PUSCH. More specifically, when dynamic beta offsets are configured, 4 values are configured for each of the above parameters. The beta_offset indicator in the DCI format may be used to indicate the values that are applied from the 4 values for each of the parameters. The beta_offset indicator for UCIs of the high priority may be included in a DCI format that schedules the high priority PUSCH when dynamic beta offsets are configured in HPUCI-OnHP-PUSCH. In some implementations, semi-static beta offsets may be configured in LPUCI-OnHPPUSCH when no explicit indication of the beta offsets for UCIs of the low priority is included in a DCI format that schedules the high priority PUSCH. Further, $\alpha_{HP-PUSCH}^{HP}$ may be used to limit the maximum number of resource elements used for multiplexing the high priority UCIs in the high priority PUSCH, and $\alpha_{HP-PUSCH}^{LP}$ may be used to limit the maximum number of resource elements used for multiplexing the low priority UCIs in the high priority PUSCH. In some implementations, $\alpha_{HP-PUSCH}^{HP}$ may be used to limit the maximum number of resource elements used for multiplexing the high priority UCIs and the low priority UCIs in the high priority PUSCH.

In some implementations, LPUCI-OnLPPUSCH and HPUCI-OnLPPUSCH are used to configure beta offsets and scaling factors for UCIs of, respectively, the low priority and UCIs of the high priority when the UE multiplexes the UCIs in a PUSCH of the low priority. For example, $\beta_{offset}^{LP\ HARQ-ACK,LP\ PUSCH}$, $\beta_{offset}^{LP\ CSI-1,HP\ PUSCH}$, $\beta_{offset}^{LP\ CSI-2,LP\ PUSCH}$, and $\alpha_{LP-PUSCH}^{LP}$ may be configured in LPUCI-OnLPPUSCH, and $\beta_{offset}^{HP\ HARQ-ACK,LP\ PUSCH}$, $\beta_{offset}^{HP\ CSI-1,LP\ PUSCH}$, $\beta_{offset}^{HP\ CSI-2,LP\ PUSCH}$, and $\alpha_{LP-PUSCH}^{HP}$ may be configured in HPUCI-OnLPPUSCH.

In addition, a beta_offset indicator (e.g., a value of the DCI field in a DCI format for indicating a beta offset from the configured beta offsets) for UCIs of the low priority may be included in a DCI format that schedules the low priority PUSCH when dynamic beta offsets are configured in LPUCI-OnLPPUSCH. The beta_offset indicator for UCIs of the high priority may be included in a DCI format that schedules the low priority PUSCH when dynamic beta offsets are configured in HPUCI-OnLPPUSCH. In some implementation, semi-static beta offsets may be configured in HPUCI-OnLPPUSCH when no explicit indication of the beta offsets for UCIs of the high priority is included in a DCI format that schedules the low priority PUSCH. Further, $\alpha_{LP-PUSCH}^{LP}$ may be used to limit the maximum number of resource elements used for multiplexing the low priority UCIs in the low priority PUSCH, and $\alpha_{LP-PUSCH}^{HP}$ may be used to limit the maximum number of resource elements used for multiplexing the high priority UCIs in the low priority PUSCH. In some implementations, $\alpha_{LP-PUSCH}^{HP}$ may be used to limit the maximum number of resource elements used for multiplexing the high priority UCIs and the low priority UCIs in the low priority PUSCH.

In some implementations, when no explicit indication of the beta offsets for UCIs of the low priority is included in a DCI format that schedules the high priority PUSCH, and dynamic beta offsets are configured in LPUCI-OnHP-PUSCH, the UE uses the beta offset with the smallest value when the UE multiplexes UCIs of the low priority in the high priority PUSCH. In some implementations, when no UCI of the high priority is multiplexed in the high priority PUSCH, the beta_offset indicator for UCIs of the high priority may be used to indicate beta offsets for UCIs of the low priority. In some implementations, the beta offsets in the same entry in LPUCI-OnHPPUSCH are indicated as the entry in HPUCI-OnHPPUSCH in which the beta offsets are indicated by the beta_offset indicator. For example, if the beta_offset indicator indicates the first set of beta offsets for UCIs of the high priority, the first set of beta offsets for UCIs of the low priority are also indicated.

In some implementations, when no explicit indication of the beta offsets for UCIs of the high priority is included in a DCI format that schedules the low priority PUSCH, and dynamic beta offsets are configured in HPUCI-OnLP-PUSCH, the UE uses the beta offset with the largest value when the UE multiplexes UCIs of the high priority in the low priority PUSCH. In some implementations, when no UCI of the low priority is multiplexed in the low priority PUSCH, the beta_offset indicator for UCIs of the low priority may be used to indicate the beta offsets for UCIs of the high priority. In some implementation, regardless of whether there are UCIs of the low priority for multiplexing in the low priority PUSCH, the beta_offset indicator for UCIs of the low priority may be used to indicate the beta offsets for UCIs of the high priority. In some implementations, the beta offsets in the same entry in HPUCI-OnLP-PUSCH are indicated as the entry in LPUCI-OnLPPUSCH in which the beta offsets are indicated by the beta_offset indicator. For example, if the beta_offset indicator indicates the first set of beta offsets for UCIs of the low priority, the first set of beta offsets for UCIs of the high priority are also indicated.

The following methods may be used to multiplex UCI(s) of the low priority PUCCH in the high priority PUSCH.

Method 6: When the low priority PUCCH overlaps the high priority PUSCH in the time domain, the UE may multiplex a UCI of the low priority PUCCH in the high priority PUSCH when one or more of the following conditions are met:

Condition 1. Timeline requirements for UCI multiplexing are satisfied for the low priority PUCCH and the high priority PUSCH.

Condition 2. A-CSI is not triggered for multiplexing in the high priority PUSCH.

Condition 3. A-CSI is triggered for multiplexing in the high priority PUSCH and all CSI part 1 reports are multiplexed in the high priority PUSCH.

Condition 4. High priority CSI with CSI part 2 is not configured or triggered in the high priority PUSCH or in the high priority PUCCH overlapping the high priority PUSCH.

Condition 5. The low priority PUCCH is PUCCH format 0 or PUCCH format 2.

Condition 6. The low priority PUCCH is a PUCCH for HARQ-ACK, and it is selected from the first PUCCH resource set.

Condition 7. The high priority PUSCH is not a configured grant (CG) PUSCH.

Condition 8. The high priority PUSCH has a duration longer than the number of OFDM symbols. The number of OFDM symbols may be preconfigured.

Condition 9. The high priority PUSCH is not PUSCH repetition type B.

Condition 10. The low priority PUCCH does not overlap the low priority PUSCH.

Condition 11. The UE is indicated with the capability of multiplexing the low priority UCIs in the high priority PUSCH.

Condition 12. A gNB configures the UE to multiplex the low priority UCIs in the high priority PUSCH.

Condition 13. An explicit indication of beta offsets for the low priority UCIs is included in the UL grant that schedules the high priority PUSCH when dynamic beta offsets are configured for the low priority UCIs.

Condition 14. The UL grant that schedules the high priority PUSCH may indicate that the low priority UCIs is multiplexed in the high priority PUSCH.

Condition 15. The number of resource elements used for multiplexing $O_{HARQ-ACK}^{HP}$ high priority HARQ-ACK codebook bits and used for multiplexing $O_{CSI\text{-}part\ 1}^{HP}$ high priority CSI part 1 bits does not exceed $$\left(\left\lceil \alpha_{HP-PUSCH}^{HP} \cdot \sum_{l=l_0}^{N_{symb,all}^{PUSCH}-1} M_{sc}^{UCI}(l) \right\rceil - X\right),$$

where X may be determined based on the beta offsets and/or scaling factor for the low priority UCIs when the UE multiplexes the low priority UCIs in the high priority PUSCH, and $\alpha_{HP-PUSCH}^{HP}$ is the scaling factor for the high priority UCIs when the UE multiplexes the high priority UCIs in the high priority PUSCH.

Condition 16. The number of resource elements in the high priority PUSCH available for multiplexing the low priority UCI bits (e.g., $$\left\lceil \alpha_{HP-PUSCH}^{HP} \cdot \sum_{l=l_0}^{N_{symb,all}^{PUSCH}-1} M_{sc}^{UCI}(l) \right\rceil$$

minus the resource elements used for multiplexing the high priority UCIs) results in a code rate of the low priority UCIs higher than a threshold, where $\alpha_{HP-PUSCH}^{HP}$ is the scaling factor for the high priority UCIs when the UE multiplexes the low priority UCIs in a high priority PUSCH. The threshold may be determined based on the preconfigured scaling factor and/or the beta offsets for the low priority UCIs when the UE multiplexes the low priority UCIs in the high priority PUSCH. The beta offsets may be indicated via the UL grant that schedules the high priority PUSCH.

Condition 17. The UE may multiplex the low priority HARQ-ACK codebook in the high priority PUSCH when one or more of the following conditions are met.

Condition 17a. The size of the low priority HARQ-ACK codebook is not larger than the number of bits that are preconfigured.

Condition 17b. The low priority HARQ-ACK codebook is the Type 1 HARQ-ACK codebook.

Condition 17c. The low priority HARQ-ACK codebook is the HARQ-ACK codebook only for one or more SPS PDSCH receptions.

Condition 17d. SPS HARQ-ACK bits for one or more SPS PDSCH receptions are not multiplexed in the low priority HARQ-ACK codebook.

Condition 17e. The low priority HARQ-ACK codebook is the Type 1 HARQ-ACK codebook and the UE transmits HARQ-ACK information in the low priority PUCCH only for the SPS PDSCH release indicated by the DCI format 1_0 with counter DAI field value of 1, or only for the PDSCH reception scheduled by the DCI format 1_0 with counter DAI field value of 1 on the PCell, or only for the SPS PDSCH reception(s) within the $M_{A,c}$ occasions for candidate PDSCH receptions as determined in Clause 9.1.2.1 in the 3GPP TS 38.213. The UL grant that schedules the high priority PUSCH may include UL total DAI field for the low priority HARQ-ACK codebook and $V_{T\text{-}DAI}^{UL}=0$.

Condition 17f. The low priority HARQ-ACK codebook includes only a TB-based sub-codebook.

Condition 17g. PDSCH-CodeBlockGroupTransmission is not provided for the low priority HARQ-ACK codebook.

Condition 17h. The UL grant that schedules the high priority PUSCH includes the UL total DAI field for the low priority HARQ-ACK codebook.

Condition 18i. The low priority HARQ-ACK codebook is the Type 1 HARQ-ACK codebook, and the UL grant that schedules the high priority PUSCH includes the UL total DAI field for the low priority HARQ-ACK codebook and the DAI value indicates $V_{T\text{-}DAI}^{UL}=1$.

Condition 18. The UE may multiplex the low priority CSI in the high priority PUSCH when one or more of the following conditions are met:

Condition 18a. The low priority CSI includes only CSI part 1.

Condition 18b. The size of the low priority CSI is not larger than the number of bits that are preconfigured.

Condition 18c. The low priority HARQ-ACK codebook is not multiplexed in the low priority PUCCH (if the high priority PUSCH was absent).

Method 7: When the low priority PUCCH including the low priority HARQ-ACK codebook overlaps the high priority PUSCH in the time domain, an UL total DAI field for the low priority HARQ-ACK codebook may be included in the UL grant that schedules the high priority PUSCH, and the UE may use the UL total DAI value for determining the size of the low priority HARQ-ACK codebook for multiplexing in the high priority PUSCH.

In some implementations, the UE may determine whether the UL total DAI field for the low priority HARQ-ACK codebook is included in the UL grant that schedules the high priority PUSCH is configured by an IE (e.g., TotalDAIforL-PUCIonHPPUSCH) in PhysicalCellGroupConfig or in PUSCH-Config. In some implementations, the number of bits is 1 if the low priority HARQ-ACK codebook is the Type 1 HARQ-ACK codebook, and the number of bits is 2 for a TB-based sub-codebook and the number of bits is 2 for the CBG-based sub-codebook (if PDSCH-CodeBlock-GroupTransmission is configured for the low priority HARQ-ACK codebook) if the low priority HARQ-ACK codebook is a Type 2 HARQ-ACK codebook. In some implementations, the UL total DAI field for the CBG-based sub-codebook is not included in the UL grant. In some implementations, the number of bits for the UL total DAI field for each sub-codebook may be 1 bit. The DAI value of 1 instructs the UE to multiplex the low priority HARQ-ACK (sub-)codebook in the high priority PUSCH, and the DAI value of 0 instructs the UE not to multiplex the low priority HARQ-ACK (sub-)codebook in the high priority PUSCH.

In some implementations, when the UL total DAI field for the low priority HARQ-ACK codebook is not included in the UL grant that schedules the high priority PUSCH, the UE may determine the UL total DAI value for the low priority HARQ-ACK codebook based on the UL total DAI field for the high priority HARQ-ACK codebook, when the low priority HARQ-ACK codebook is multiplexed in the high priority PUSCH and the high priority HARQ-ACK codebook is not multiplexed in the high priority PUSCH.

In some implementations, when the UL total DAI field for the low priority HARQ-ACK CBG-based sub-codebook is not included in the UL grant that schedules a high priority PUSCH, the UE may determine the UL total DAI value for the low priority HARQ-ACK CBG-based sub-codebook based on the UL total DAI field for the high priority HARQ-ACK CBG-based sub-codebook, regardless of whether or not the high priority HARQ-ACK CBG-based sub-codebook is multiplexed in the high priority PUSCH.

When the UL total DAI is not used for determining the size of the low priority HARQ-ACK (sub-)codebook, the rate matching for multiplexing the low priority HARQ-ACK codebook may be based on the preconfigured or predefined HARQ-ACK codebook size. The number of resource elements for multiplexing the low priority HARQ-ACK codebook, $Q_{LP\ ACK}'$, may be determined based on the preconfigured or predefined HARQ-ACK codebook size and the preconfigured scaling factor and/or the beta offsets for the low priority UCIs when the UE multiplexes the low priority HARQ-ACK codebook in the high priority PUSCH. When the code rate of the low priority HARQ-ACK codebook mapped to $Q_{LP\ ACK}'$ resource elements exceeds a threshold, the UE does not multiplex the low priority HARQ-ACK codebook in the high priority PUSCH. The threshold may be determined based on the preconfigured scaling factor and/or the beta offsets for the low priority UCIs when the UE multiplexes the low priority HARQ-ACK codebook in the high priority PUSCH. It is noted that the available resource elements for multiplexing the low priority HARQ-ACK codebook may be less than $Q_{LP\ ACK}'$. The available resource elements for multiplexing the low priority HARQ-ACK codebook depend on the number of resource elements used for multiplexing the high priority HARQ-ACK codebook and/or the high priority CSI, and the maximum number of resource elements used for multiplexing UCIs (e.g., determined based on $\alpha_{HP-PUSCH}^{HP}$). In some implementations, when the size of the low priority HARQ-ACK codebook is smaller than a preconfigured or predefined HARQ-ACK codebook size, a number of zero bits are padded to the low priority HARQ-ACK codebook until the size is equal to the preconfigured or predefined HARQ-ACK codebook size. In some implementations, when the size of the low priority HARQ-ACK codebook is larger than preconfigured or predefined HARQ-ACK codebook size, the low priority HARQ-ACK codebook is truncated until the size is equal to the preconfigured or predefined HARQ-ACK codebook size.

In some implementations, when the UL total DAI is not used for determining the size of the low priority HARQ-ACK (sub-)codebook, the rate matching is based on the previously mentioned method 7 when the size of the low priority HARQ-ACK codebook is smaller than a threshold (e.g., 12 or 20 bits), and the rate matching is based on the low priority HARQ-ACK codebook size when the size of the low priority HARQ-ACK codebook is larger than or equal to the threshold. In some implementations, when the size of the low priority HARQ-ACK codebook is smaller than the threshold, a number of zero bits are padded to the low priority HARQ-ACK codebook until the size is equal to the threshold, and the rate matching is based on the low priority HARQ-ACK codebook size with zero padding.

In some implementations, when the UL total DAI is not used for determining the size of the low priority HARQ-ACK (sub-)codebook, the rate matching is based on the low priority HARQ-ACK codebook size, and the coded low priority HARQ-ACK codebook is mapped to the high priority PUSCH from the last OFDM symbol of the PUSCH and mapped backwards to the earlier OFDM symbols.

The following method may be used to determine the number of available resource elements and a threshold of the number of available resource elements for multiplexing the low priority UCIs in the high priority PUSCH.

Method 8: When the high priority PUCCH and the low priority PUCCH overlap the high priority PUSCH, the UE may perform the rate matching for the UCIs of the high priority PUCCH for multiplexing in the high priority PUSCH based on the beta offsets and the scaling factor of UCIs of high priority when the UE multiplexes the UCIs of the high priority PUCCH in the high priority PUSCH (e.g., based on $\beta_{offset}^{HP\ HARQ-ACK,HP\ PUSCH}$, $\beta_{offset}^{HP\ CSI-1,HP\ PUSCH}$, $\beta_{offset}^{HP\ CSI-2,HP\ PUSCH}$, and $\alpha_{HP-PUSCH}^{HP}$). For example, the UE may calculate the number of resource elements for multiplexing the high priority HARQ-ACK codebook, $Q'_{HP_{ACK}}$ according to the equation:

$$Q'_{HP\ ACK} = \min\left\{\left\lceil \frac{(O_{HP\ ACK} + L_{HP\ ACK}) \cdot \beta_{offset}^{HP\ HARQ-ACK,HP\ PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left.\left\lceil \alpha_{HP-PUSCH}^{HP} \cdot \sum_{l=l_0}^{N_{symb,all}^{PUSCH}-1} M_{sc}^{UCI}(l) \right\rceil \right\},$$

where $O_{HP\ ACK}$ is the payload size of the high priority HARQ-ACK codebook, and $L_{HP\ ACK}$ is the size of the CRC of the high priority HARQ-ACK codebook, and $N_{symb,all}^{PUSCH}$, $M_{SC}^{UCI}(l)$, $C_{UL-SCH}$, and $K_r$ are defined in the 3GPP TS 38.212 V16.3.0, and $l_0$ is the OFDM symbol index of the first OFDM symbol after the first set of consecutive OFDM symbol(s) carrying demodulation reference signal (DMRS). The remaining number of resource elements available for multiplexing high priority UCIs and low priority UCIs in the high priority PUSCH may be determined as $$\left[\alpha_{HP-PUSCH}^{HP} \cdot \sum_{l=0}^{N_{symb,all}^{PUSCH}-1} M_{sc}^{UCI}(l)\right] - Q'_{HP\,ACK}.$$

If no high priority CSI is multiplexed in the high priority PUSCH, but the low priority HARQ-ACK codebook is multiplexed in the high priority PUSCH, the UE may map the low priority HARQ-ACK codebook to the resource elements not used for mapping the high priority HARQ-ACK codebook in symbols starting at symbol $l'_0$, where $l'_0$ may be preconfigured or predefined (e.g., $l'_0$ may be the OFDM symbol index of the first OFDM symbol after the first set of consecutive OFDM symbol(s) carrying DMRS in the second hop of the high priority PUSCH). $l'_0$ may be the same as $l_0$. In some implementations, the UE may map the low priority HARQ-ACK codebook to the resource elements reserved for the high priority HARQ-ACK codebook when the number of bits for the high priority HARQ-ACK codebook is 0, 1, or 2 bits, before the low priority HARQ-ACK codebook is punctured by the high priority HARQ-ACK codebook. The UE may determine whether to multiplex the low priority HARQ-ACK codebook in the high priority PUSCH according to a minimum number of resource elements that are calculated according to the equation:

$$Q'_{LPACK,min} = \min\left\{\left\lceil \frac{(O_{LP\,ACK} + L_{LP\,ACK}) \cdot \beta_{offset}^{LP\,HARQ-ACK,HP\,PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$
$$\left.\left\lceil \alpha_{HP-PUSCH}^{HP} \cdot \sum_{l=l'_0}^{N_{symb,all}^{PUSCH}-1} M_{sc}^{UCI}(l) \right\rceil \right\}.$$

In some implementations, $$Q'_{LPACK,min} = \min\left\lceil \frac{(O_{LP\,ACK} + L_{LP\,ACK}) \cdot \beta_{offset}^{LP\,HARQ-ACK,HP\,PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil.$$

If $Q'_{LP\,ACK,min}$ is larger than $$\left[\alpha_{HP-PUSCH}^{HP} \cdot \sum_{l=l'_0}^{N_{symb,all}^{PUSCH}-1} M_{sc}^{UCI}(l)\right] - Q'_{HPACK,l'_0},$$

the UE does not multiplex the low priority HARQ-ACK codebook in the high priority PUSCH, where $$Q'_{HPACK,l'_0} = Q'_{HPACK} - \sum_{l=0}^{l'_0-1} M_{sc}^{HPACK}(l)$$

is the number of resource elements in symbols starting at symbol $l'_0$ that are used for mapping the high priority HARQ-ACK codebook, where $M_{sc}^{HP\,ACK}(l)$ is the number of resource elements used for mapping high priority HARQ-ACK codebook in symbol l. In some implementations, when the high priority HARQ-ACK codebook is not multiplexed in the high priority PUSCH, if $Q'_{LP\,ACK,min}$ is larger than $$\left[\alpha_{HP-PUSCH}^{LP} \cdot \sum_{l=l'_0}^{N_{symb,all}^{PUSCH}-1} M_{sc}^{UCI}(l)\right] - RE_{rvd,HP,l'_0},$$

the UE does not multiplex the low priority HARQ-ACK codebook in the high priority PUSCH, where $$RE_{rvd,HP,l'_0}$$

is the number of reserved resource elements for the high priority HARQ-ACK codebook in symbols starting at $l'_0$. On the other hand, if the high priority CSI is multiplexed in the high priority PUSCH, and the low priority HARQ-ACK codebook is multiplexed in the high priority PUSCH, the UE may map the low priority HARQ-ACK codebook first, where the low priority HARQ-ACK codebook is mapped to the resource elements that are not used for mapping the high priority HARQ-ACK codebook in symbols starting at symbol $l'_0$, and then the UE may map the high priority CSI to the resource elements that are not used for mapping the high priority HARQ-ACK codebook and the low priority HARQ-ACK codebook in symbols starting at symbol 0. Alternatively, the UE may map the low priority HARQ-ACK codebook after the high priority CSI is mapped, and the low priority HARQ-ACK codebook is mapped to the resource elements that is not used for mapping the high priority HARQ-ACK codebook and the high priority CSI in symbols starting at symbol $l'_0$. The UE may calculate the number of resource elements for multiplexing the high priority CSI part 1, $Q'_{HP\,CSI-1}$ according to the equation:

$$Q'_{HP\,CSI-1} = \min\left\{\left\lceil \frac{(O_{HP\,CSI-1} + L_{HP\,CSI-1}) \cdot \beta_{offset}^{HP\,CSI-1,HP\,PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$
$$\left.\left\lceil \alpha_{HP-PUSCH}^{HP} \cdot \sum_{l=0}^{N_{symb,all}^{PUSCH}-1} M_{sc}^{UCI}(l) \right\rceil - Q'_{HP\,ACK}\right\}.$$

The UE may calculate the number of resource elements in symbols starting at symbol $l'_0$ that are used for mapping the high priority CSI part 1, $Q'_{HP\ CSI-1,l'_0}$, as according to the equation:

$$Q'_{HPCSI-1,l'_0} = Q'_{HPCSI-1} - \sum_{l=0}^{l'_0-1} M_{sc}^{HPCSI-1}(l),$$

where $M_{sc}^{HP\ CSI-1}(l)$ is the number of resource elements used for mapping high priority CSI part 1 in symbol l. If $Q'_{LP\ ACK,min}$ is larger than $$\left[ \alpha_{HP-PUSCH}^{HP} \cdot \sum_{l=l'_0}^{N_{symb,all}^{PUSCH}-1} M_{sc}^{UCI}(l) \right] - Q'_{HPACK,l'_0} - Q'_{HPCSI-1,l'_0},$$

the UE does not multiplex the low priority HARQ-ACK codebook in the high priority PUSCH (e.g., assuming the high priority CSI includes only the CSI part 1).

In some implementations, if the high priority CSI part 2 is multiplexed in the high priority PUSCH, the UE may omit the number of CSI part 2 reports, to provide some resource elements for multiplexing the low priority HARQ-ACK codebook. The number of CSI part 2 reports may be preconfigured, or may be determined based on the CSI report priority value specified in Clause 5.2.5 of the 3GPP TS 38.214. For example, if the CSI part 2 report is a report with the priority value higher than the preconfigured or predefined threshold, the UE may omit the CSI part 2 report when the low priority HARQ-ACK codebook is multiplexed in the high priority PUSCH. When there is a high priority CSI part 2, the UE may calculate the number of resource elements for multiplexing the high priority CSI part 2, $Q'_{HP\ CSI-2}$ according to the equation:

$$Q'_{HP\ CSI-2} = \min \left\{ \left\lceil \frac{(O_{HP\ CSI-2} + L_{HP\ CSI-2}) \cdot \beta_{offset}^{HP\ CSI-2,HP\ PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lfloor \alpha_{HP-PUSCH}^{HP} \cdot \sum_{l=0}^{N_{symb,all}^{PUSCH}-1} M_{sc}^{UCI}(l) \right\rfloor - Q'_{HP\ ACK} - Q'_{HP\ CSI-1} \right\}.$$

The UE may calculate the number of resource elements in symbols starting at symbol $l'_0$ that are used for mapping the high priority CSI part 2, $$Q'_{HP\ CSI-2,l'_0}$$

according to the equation:

$$Q'_{HPCSI-2,l'_0} = Q'_{HPCSI-2} - \sum_{l=0}^{l'_0-1} M_{sc}^{HPCSI-2}(l),$$

where $M_{sc}^{HP\ CSI-2}(l)$ is the number of resource elements used for mapping high priority CSI part 2 in symbol l. If $Q'_{LP\ ACK,min}$ is larger than $$\left[ \alpha_{HP-PUSCH}^{HP} \cdot \sum_{l=l'_0}^{N_{symb,all}^{PUSCH}-1} M_{sc}^{UCI}(l) \right] - Q'_{HP\ ACK,l'_0} - Q'_{HP\ CSI-1,l'_0} - Q'_{HP\ CSI-2,l'_0},$$

the UE does not multiplex the low priority HARQ-ACK codebook in the high priority PUSCH. It is noted that, when the number of bits for the high priority HARQ-ACK codebook is 0, 1, or 2 bits, the UE may calculate the number of reserved resource elements for the high priority HARQ-ACK codebook, and the UE may map the CSI part 2 to the reserved resource elements before the CSI part 2 is punctured by the high priority HARQ-ACK codebook. In this case, if $Q'_{LP\ ACK,min}$ is larger than $$\left[ \alpha_{HP-PUSCH}^{HP} \cdot \sum_{l=l'_0}^{N_{symb,all}^{PUSCH}-1} M_{sc}^{UCI}(l) \right] - Q'_{HP\ ACK,l'_0} -$$
$$Q'_{HP\ CSI-1,l'_0} - Q'_{HP\ CSI-2,l'_0} + \max\{Q'_{HP\ CSI-2,l'_0} - RE_{rvd,HP,l'_0}, 0\},$$

(e.g., assuming the low priority HARQ-ACK codebook is not mapped to the reserved resource elements before the low priority HARQ-ACK codebook is punctured by the high priority HARQ-ACK codebook), the UE does not multiplex the low priority HARQ-ACK codebook in the high priority PUSCH, where $$RE_{rvd,HP,l'_0}$$

is the number of reserved resource elements for the high priority HARQ-ACK codebook in symbols starting at $l'_0$. Alternatively, the term $$\max\{Q'_{HP\ CSI-2,l'_0} - RE_{rvd,HP,l'_0}, 0\}$$

in the previously mentioned equation is not needed if the UE maps the low priority HARQ-ACK codebook to the reserved resource elements before the low priority HARQ-ACK codebook is punctured by the high priority HARQ-ACK codebook. If the low priority HARQ-ACK codebook is not multiplexed in the high priority PUSCH, the UE may not omit the CSI part 2 reports with priority value higher than the preconfigured or predefined priority value. It is noted that the UE may omit some CSI part 2 reports specified in the 3GPP TS 38.214. In some implementations, the UE may omit the CSI part 2 reports in descending order of priority value from the CSI part 2 report with the highest priority value until the number of resource elements available for multiplexing the low priority HARQ-ACK codebook is equal to or larger than $Q'_{LP\ ACK,min}$.

In some implementations, when the number of resource elements is not enough for multiplexing the low priority HARQ-ACK codebook, the UE may compress the low priority HARQ-ACK codebook according to the methods for HARQ-ACK codebook compression disclosed below.

In some implementations, when the number of resource elements is not enough for multiplexing the low priority HARQ-ACK codebook, the UE may omit the HARQ-ACK bits in the low priority HARQ-ACK codebook corresponding to dynamically-scheduled PDSCH receptions. Alternatively, the UE may omit the HARQ-ACK bits in the low priority HARQ-ACK codebook corresponding to SPS PDSCH receptions.

In some implementations, the UE may map the high priority CSI part 1 to the resource elements reserved for the high priority HARQ-ACK codebook before the high priority CSI part 1 is punctured by the high priority HARQ-ACK codebook.

In some implementations, the UE may map the low priority HARQ-ACK codebook to the resource elements reserved for the high priority HARQ-ACK codebook before the low priority HARQ-ACK codebook is punctured by the high priority HARQ-ACK codebook.

In some implementations, when the payload size of the high priority HARQ-ACK codebook is equal or less than the preconfigured or predefined payload size, the UE may calculate the number of resource elements reserved for the high priority HARQ-ACK codebook based on the preconfigured or predefined payload size as $$RE_{rvd,HP} = \min\left\{\left[\frac{(O_{HP\,ACK,rvd} + L_{HP\,ACK,rvd}) \cdot \beta_{offset}^{HP\,HARQ-ACK,HP\,PUSCH} \cdot \sum_{l=0}^{N_{symb,all}^{PUSCH}-1} M_{sc}^{UCI}(l)}{\sum_{r=0}^{C_{UL-SCH}-1} K_r}\right],\left[\alpha_{HP-PUSCH}^{HP} \cdot \sum_{l=l_0}^{N_{symb,all}^{PUSCH}-1} M_{sc}^{UCI}(l)\right]\right\}$$

where $O_{HP\,ACK,rvd}$ is the preconfigured or predefined payload size and $L_{HP\,ACK,rvd}$ is the size of the CRC for the preconfigured or predefined payload size, and the high priority HARQ-ACK codebook is mapped to a subset or all of the reserved resource elements.

High Priority PUSCH Without UL-SCH

In some implementations, when the high priority PUSCH does not include UL-SCH, the UE may calculate the number of resource elements for multiplexing the high priority HARQ-ACK codebook, $Q'_{HP\,ACK}$ according to the equation:

$$Q'_{HP\,ACK} = \min\left\{\left[\frac{(O_{HP\,ACK} + L_{HP\,ACK})\beta_{offset}^{HP\,HARQ-ACK,HP\,PUSCH}}{R \cdot Q_m}\right],\left[\alpha_{HP-PUSCH}^{HP} \cdot \sum_{l=l_0}^{N_{symb,all}^{PUSCH}-1} M_{sc}^{UCI}(l)\right]\right\}$$

where R is the code rate of the high priority PUSCH and $Q_m$ is the modulation order of the high priority PUSCH. The UE may determine the remaining number of resource elements available for multiplexing the high priority UCIs and the low priority UCIs in the high priority PUSCH as $$\sum_{l=0}^{N_{symb,all}^{PUSCH}-1} M_{sc}^{UCI}(l) - Q'_{HP\,ACK}.$$

The UE may map the low priority HARQ-ACK codebook first, the low priority HARQ-ACK codebook mapped to the resource elements that are not used for mapping the high priority HARQ-ACK codebook in symbols starting at symbol $l'_0$, where $l'_0$ may be preconfigured or predefined (e.g., $l'_0$ may be the OFDM symbol index of the first OFDM symbol after the first set of consecutive OFDM symbol(s) carrying DMRS in the second hop of the high priority PUSCH). $l'_0$ may be the same as $l_0$. In some implementations, the UE may map the low priority HARQ-ACK codebook to the resource elements reserved for the high priority HARQ-ACK codebook when the number of bits for the high priority HARQ-ACK codebook is 0, 1, or 2 bits, before the low priority HARQ-ACK codebook is punctured by the high priority HARQ-ACK codebook. The UE may map the high priority aperiodic CSI to the resource elements that are not used for mapping the high priority HARQ-ACK codebook and the low priority HARQ-ACK codebook in symbols starting at symbol 0. Alternatively, the UE may map the low priority HARQ-ACK codebook after the high priority aperiodic CSI is mapped, where the low priority HARQ-ACK codebook is mapped to the resource elements that are not used for mapping the high priority HARQ-ACK codebook and the high priority aperiodic CSI in symbols starting at symbol $l'_0$. The UE may calculate the number of resource elements for multiplexing the high priority CSI part 1, $Q'_{HP\,CSI-1}$ according to the equation:

$$Q'_{HP\,CSI-1} = \min\left\{\left[\frac{(O_{HP\,CSI-1} + L_{HP\,CSI-1})\beta_{offset}^{HP\,CSI-1,HP\,PUSCH}}{R \cdot Q_m}\right],\sum_{l=0}^{N_{symb,all}^{PUSCH}-1} M_{sc}^{UCI}(l) - Q'_{HP\,ACK}\right\}.$$

The UE may calculate the number of resource elements in symbols starting at symbol $l'_0$ that are used for mapping the high priority CSI part 1, $$Q'_{HPCSI-1,l'_0}$$

according to the equation:

$$Q'_{HPCSI-1,l'_0} = Q'_{HPCSI-1} - \sum_{l=0}^{l'_0-1} M_{sc}^{HPCSI-1}(l),$$

where $M_{SC}^{HP\,CSI-1}(l)$ is the number of resource elements used for mapping the high priority CSI part 1 in symbol l. The UE may calculate the number of available resource elements for multiplexing the low priority HARQ-ACK, $Q'_{LP\,ACK}$, according to the equation:

$$Q'_{LPACK} = \sum_{l=l'_0}^{N_{symb,all}^{PUSCH}-1} M_{sc}^{UCI}(l) - Q'_{HPACK,l'_0} - Q'_{HPCSI-1,l'_0}.$$

In some implementations, $$Q'_{LP\,ACK} = \left\lceil \alpha^{HP}_{HP-PUSCH} \cdot \sum_{l=l'_0}^{N^{PUSCH}_{symb,all}-1} M^{UCI}_{sc}(l) \right\rceil - Q'_{HP\,ACK,l'_0} - Q'_{HP\,CSI-1,l'_0}.$$

Accordingly, the low priority HARQ-ACK codebook is multiplexed in the high priority PUSCH if the code rate calculated as $(O_{LP\,ACK}+L_{LP\,ACK})/(N_L \cdot Q'_{LP\,ACK} \cdot Q_m)$ is lower than a code rate threshold. The code rate threshold may be calculated as $$\frac{R}{\beta^{LP\,HARQ-ACK,HP\,PUSCH}_{offset}}.$$

It is noted that, if the low priority HARQ-ACK codebook is not multiplexed in the high priority PUSCH, the UE may calculate the number of resource elements for multiplexing the high priority CSI part 1, $Q'_{HP\,CSI-1}$, according to the equation:

$$Q'_{HP\,CSI-1} = \sum_{l=0}^{N^{PUSCH}_{symb,all}-1} M^{UCI}_{sc}(l) - Q'_{HP\,ACK}.$$

In some implementations, if the high priority CSI part 2 is multiplexed in the high priority PUSCH without the UL-SCH, the UE may omit the number of CSI part 2 reports, to provide some resource elements for multiplexing the low priority HARQ-ACK codebook. The number of CSI part 2 reports may be preconfigured, or may be determined based on a CSI report priority value specified in Clause 5.2.5 of the 3GPP TS 38.214. For example, if the CSI part 2 report is the report with a priority value higher than the preconfigured or predefined threshold, the UE may omit the CSI part 2 report when the low priority HARQ-ACK codebook is multiplexed in the high priority PUSCH. When there is high priority CSI part 2, the UE may calculate the number of resource elements for multiplexing the high priority CSI part 2, $Q'_{HP\,CSI-2}$ according to the equation.

$$Q'_{HP\,CSI-2} = \min\left\{ \left\lceil \frac{(O_{HP\,CSI-2} + L_{HP\,CSI-2})\beta^{HP\,CSI-2,HP\,PUSCH}_{offset}}{RQ_m} \right\rceil, \right.$$
$$\left. \sum_{l=0}^{N^{PUSCH}_{symb,all}-1} M^{UCI}_{sc}(l) - Q'_{HP\,ACK} - Q'_{HP\,CSI-1} \right\}.$$

The UE may calculate the number of resource elements in symbols starting at symbol $l'_0$ that are used for mapping the high priority CSI part 2, $$Q'_{HP\,CSI-2,l'_0}$$

according to the equation:

$$Q'_{HP\,CSI-2,l'_0} = Q'_{HP\,CSI-2} - \sum_{l=0}^{l'_0-1} M^{HP\,CSI-2}_{sc}(l),$$

where $M_{sc}^{HP\,CSI-2}(l)$ is the number of resource elements used for mapping the high priority CSI part 2 in symbol l. Then, the UE may calculate the number of available resource elements for multiplexing the low priority HARQ-ACK, $Q'_{LP\,ACK}$ according to the equation:

$$Q'_{LP\,ACK} = \sum_{l=l'_0}^{N^{PUSCH}_{symb,all}-1} M^{UCI}_{sc}(l) - Q'_{HP\,ACK,l'_0} - Q'_{HP\,CSI-1,l'_0} - Q'_{HP\,CSI-2,l'_0}.$$

In some implementations, $$Q'_{LP\,ACK} = \left\lceil \alpha^{HP}_{HP-PUSCH} \cdot \sum_{l=l'_0}^{N^{PUSCH}_{symb,all}-1} M^{UCI}_{sc}(l) \right\rceil - Q'_{HP\,ACK,l'_0} - Q'_{HP\,CSI-1,l'_0} - Q'_{HP\,CSI-2,l'_0}.$$

Accordingly, the UE may multiplex the low priority HARQ-ACK codebook in the high priority PUSCH if the code rate calculated as $(O_{LP\,ACK}+L_{LP\,ACK})/(N_L \cdot Q'_{LP\,ACK} \cdot Q_m)$ is lower than a code rate threshold. The code rate threshold may be calculated as $$\frac{R}{\beta^{LP\,HARQ-ACK,HP\,PUSCH}_{offset}}.$$

It is noted that, if the low priority HARQ-ACK codebook is not multiplexed in the high priority PUSCH, the UE may calculate the number of resource elements for multiplexing the high priority CSI part 2, $Q'_{HP\,CSI-2}$ according to the equation:

$$Q'_{HP\,CSI-2} = \sum_{l=0}^{N^{PUSCH}_{symb,all}-1} M^{UCI}_{sc}(l) - Q'_{HP\,ACK} - Q'_{HP\,CSI-1}.$$

It is noted that, when the number of bits for the high priority HARQ-ACK codebook is 0, 1, or 2 bits, the UE may calculate the number of reserved resource elements for the high priority HARQ-ACK codebook, and the UE may map the CSI part 2 to the reserved resource elements before the CSI part 2 is punctured by the high priority HARQ-ACK codebook. In this case, the UE may calculate the number of available resource elements for multiplexing low priority HARQ-ACK $Q'_{LP\,ACK}$, according to the equation:

$$Q'_{LP\,ACK} = \sum_{l=l'_0}^{N^{PUSCH}_{symb,all}-1} M^{UCI}_{sc}(l) - Q'_{HP\,ACK,l'_0} -$$
$$Q'_{HP\,CSI-1,l'_0} - Q'_{HP\,CSI-2,l'_0} + \max\{Q'_{HP\,CSI-2,l'_0} - RE_{rvd,HP,l'_0}, 0\}$$

(assuming the low priority HARQ-ACK codebook is not mapped to the reserved resource elements before the low priority HARQ-ACK codebook is punctured by the high priority HARQ-ACK codebook), where $RE_{rvd,HP,l'_0}$ is the number of reserved resource elements for the high priority HARQ-ACK codebook in symbols starting at $l'_0$. In some implementations, $$Q'_{LP\,ACK} = \left\lceil \alpha^{HP}_{HP-PUSCH} \cdot \sum_{i=l'_0}^{N^{PUSCH}_{symb,all}-1} M^{UCI}_{sc}(l) \right\rceil - Q'_{HP\,ACK,l'_0} -$$

$$Q'_{HP\,CSI-1,l'_0} - Q'_{HP\,CSI-2,l'_0} + \max\{Q'_{HP\,CSI-2,l'_0} - RE_{rvd,HP,l'_0}, 0\}.$$

Alternatively, the term $$\max\{Q'_{HP\,CSI-2,l'_0} - RE_{rvd,HP,l'_0}, 0\}$$

in the previously mentioned equation is not needed if the UE maps the low priority HARQ-ACK codebook to the reserved resource elements before the low priority HARQ-ACK codebook is punctured by the high priority HARQ-ACK codebook. Accordingly, the UE may multiplex the low priority HARQ-ACK codebook in the high priority PUSCH if the code rate calculated as $(O_{LP\,ACK}+L_{LP\,ACK})/(N_L \cdot Q'_{LP\,ACK} \cdot Q_m)$ is lower than a code rate threshold. The code rate threshold may be calculated as $$\frac{R}{\beta^{LP\,HARQ-ACK,HP\,PUSCH}_{offset}}.$$

If the low priority HARQ-ACK codebook is not multiplexed in the high priority PUSCH, the UE may not omit the CSI part 2 reports with priority value higher than the preconfigured or predefined priority value. It is noted that the UE may omit some CSI part 2 reports specified in the 3GPP TS 38.214. In some implementations, the UE may omit the CSI part 2 reports in descending order of priority value from the CSI part 2 report with the highest priority value until the number of resource elements available for multiplexing the low priority HARQ-ACK codebook results in a code rate lower than $(O_{LP\,ACK}+L_{LP\,ACK})/(N_L \cdot Q'_{L\,PACK} \cdot Q_m)$.

In some implementations, when the number of resource elements available for multiplexing the low priority HARQ-ACK codebook results in a code rate lower than $(O_{LP\,ACK}+L_{LP\,ACK})/(N_L \cdot Q'_{LP\,ACK} \cdot Q_m)$, the UE may compress the low priority HARQ-ACK codebook according to the methods for HARQ-ACK codebook compression disclosed below.

In some implementations, when the number of resource elements available for multiplexing the low priority HARQ-ACK codebook results in a code rate lower than $(O_{LP\,ACK}+L_{LP\,ACK})/(N_L \cdot Q'_{LP\,ACK} \cdot Q_m)$, the UE may omit the HARQ-ACK bits in the low priority HARQ-ACK codebook corresponding to dynamically-scheduled PDSCH receptions. Alternatively, the UE may omit the HARQ-ACK bits in the low priority HARQ-ACK codebook corresponding to SPS PDSCH receptions.

In some implementations, the UE may map the high priority CSI part 1 to the resource elements reserved for the high priority HARQ-ACK codebook before the high priority CSI part 1 is punctured by the high priority HARQ-ACK codebook.

In some implementations, the UE may map the low priority HARQ-ACK codebook to the resource elements reserved for the high priority HARQ-ACK codebook before the low priority HARQ-ACK codebook is punctured by the high priority HARQ-ACK codebook.

In some implementations, when the payload size of the high priority HARQ-ACK codebook is equal or less than the preconfigured or predefined payload size, the UE may calculate the number of resource elements reserved for the high priority HARQ-ACK codebook according to the equation:

$$RE_{rvd,HP} = \min\left\{\left\lceil \frac{(O_{HP\,ACK,rvd} + L_{HP\,ACK,rvd}) \cdot \beta^{HP\,HARQ-ACK,HP\,PUSCH}_{offset}}{R \cdot Q_m} \right\rceil,\right.$$

$$\left.\left\lceil \alpha^{HP}_{HP-PUSCH} \cdot \sum_{i=l_0}^{N^{PUSCH}_{symb,all}-1} M^{UCI}_{sc}(l) \right\rceil\right\},$$

where $O_{HP\,ACK,rvd}$ is the preconfigured or predefined payload size, and $L_{HP\,ACK,rvd}$ is the size of the CRC for the preconfigured or predefined payload size, and the high priority HARQ-ACK codebook is mapped to a subset or all of the reserved resource elements.

In some implementations, when the high priority PUSCH is a CG PUSCH with a CG-UCI, the UE may prepend the CG UCI to the high priority HARQ-ACK codebook bits if the high priority HARQ-ACK codebook bits are multiplexed in the high priority PUSCH. In this case, the $O_{HP\,ACK}$ may be the total payload size of the CG-UCI and the high priority HARQ-ACK codebook. If no high priority HARQ-ACK codebook bit is multiplexed in the high priority PUSCH, the UE may determine the CG-UCI as the high priority HARQ-ACK codebook and $O_{HP\,ACK}$ may be the total payload size of the CG-UCI.

The following method may be used to compress the size of the low priority HARQ-ACK codebook when the UE multiplexes the low priority HARQ-ACK codebook in the high priority PUSCH.

Method 9: Spatial bundling parameters and CBG parameters may be separately configured for the low priority HARQ-ACK codebook when the UE multiplexes the low priority HARQ-ACK codebook in the high priority PUSCH, and configured for the low priority HARQ-ACK codebook when the UE multiplexes the low priority HARQ-ACK codebook in the low priority PUSCH.

In some implementations, harq-ACK-Spatial-BundlingHPPUSCH may be configured in PhysicalCellGroupConfig to instruct the UE to perform the spatial bundling for the low priority HARQ-ACK codebook when the low priority HARQ-ACK codebook is multiplexed in the high priority PUSCH, and harq-ACK-SpatialBundling-PUSCH may be configured in PhysicalCellGroupConfig to instruct the UE to perform the spatial bundling for the low priority HARQ-ACK codebook when the low priority HARQ-ACK codebook is multiplexed in the low priority PUSCH. In some implementations, when harq-ACK-SpatialBundlingPUSCH is configured, the UE may perform the spatial bundling for the low priority HARQ-ACK codebook when the low priority HARQ-ACK codebook is multiplexed in the high priority PUSCH.

In some implementations, harq-ACK-TBHPPUSCH may be configured in PhysicalCellGroupConfig or in PUSCH-Config to instruct the UE to compress the CBG based HARQ-ACK codebook. In some implementations, if the low priority HARQ-ACK codebook is the Type-1 HARQ-ACK codebook, the UE transmits only HARQ-ACK bits for the TBs in the PDSCHs corresponding to the low priority HARQ-ACK codebook when the low priority HARQ-ACK codebook is multiplexed in the high priority PUSCH. In some implementations, if the low priority HARQ-ACK codebook is the Type-2 HARQ-ACK codebook, the UE transmits only the TB-based sub-codebook of the low priority HARQ-ACK codebook when the low priority HARQ-ACK codebook is multiplexed in the high priority PUSCH. In some implementation, if the low priority HARQ-ACK codebook is the Type-2 HARQ-ACK codebook, the UE transmits the TB-based sub-codebook of the low priority HARQ-ACK codebook, and the HARQ-ACK bits for the TBs in the PDSCHs corresponding to the CBG based sub-codebook of the low priority HARQ-ACK codebook when the low priority HARQ-ACK codebook is multiplexed in a high priority PUSCH.

The following methods may be used to multiplex UCI(s) of the high priority PUCCH in the low priority PUSCH.

Method 10: When the high priority PUCCH overlaps with the low priority PUSCH in the time domain, the UE may multiplex a UCI of the high priority PUCCH in the low priority PUSCH when one or more of the following conditions are met:

Condition 1. Timeline requirements for UCI multiplexing are satisfied for the high priority PUCCH and the low priority PUSCH.

Condition 2. A-CSI is not triggered for multiplexing in the low priority PUSCH.

Condition 3. Low priority CSI part 2 is not multiplexed in the low priority PUSCH.

Condition 4. The low priority PUSCH is contained in the same sub-slot as the high priority PUCCH.

Condition 5. The low priority PUSCH is not configured or scheduled with PUSCH repetition.

Condition 6. The high priority PUCCH is scheduled by a DCI format.

Condition 7. The low priority PUSCH is not a CG PUSCH.

Condition 8. The low priority PUSCH contains only front loaded DMRS.

Condition 9. The PUCCH does not contain HARQ-ACK information. For example, only multiplexing the high priority CSI in the low priority PUSCH is allowed.

Condition 10. The HARQ-ACK codebook in the high priority PUCCH is the Type 1 HARQ-ACK codebook.

Condition 11. The UE is indicated with the capability of multiplexing the high priority UCIs in the low priority PUSCH.

Condition 12. A gNB configures the UE to multiplex the high priority UCIs in the low priority PUSCH.

Condition 13. An explicit indication of beta offsets for the high priority UCIs is included in the UL grant that schedules the low priority PUSCH when dynamic beta offsets are configured for the high priority UCIs.

Condition 14. The UL grant that schedules the low priority PUSCH indicates that the high priority UCIs may be multiplexed in the low priority PUSCH.

Condition 15. The modulation order of the low priority PUSCH is not larger than a threshold. The threshold may be preconfigured or may be determined based on MCS table configuration. For example, if 'qam64LowSE' is configured for the DCI format 0_2, the threshold may be determined to be '6'.

Condition 16. The number of resource elements in the low priority PUSCH available for multiplexing the high priority UCI bits $$\left(e.g., \left\lceil \alpha_{LP-PUSCH}^{HP} \cdot \sum_{l=l_0}^{N_{symb,all}^{PUSCH}-1} M_{sc}^{UCI}(l) \right\rceil\right),$$

results in a code rate of one or more of the high priority UCIs higher than a threshold, where $\alpha_{LP-PUSCH}^{HP}$ is the scaling factor for high priority UCIs when the high priority UCIs is multiplexed in the low priority PUSCH. The threshold may be determined based on the preconfigured scaling factor and/or beta offsets for the high priority UCIs when the high priority UCIs is multiplexed in the low priority PUSCH. The beta offsets may be indicated via the UL grant that schedules the low priority PUSCH.

Condition 17. The UE may multiplex the high priority HARQ-ACK codebook in the low priority PUSCH when one or more of the following conditions are met:

Condition 17a. The size of the low priority HARQ-ACK codebook is not larger than a number of bits. For example, the number of bits may be preconfigured. The number of bits may be 2.

Condition 17b. The high priority HARQ-ACK codebook includes only a TB-based sub-codebook.

Condition 17c. PDSCH-CodeBlockGroupTransmission is not provided for the high priority HARQ-ACK codebook.

Condition 17d. The UL grant that schedules the low priority PUSCH includes the UL total DAI field for the high priority HARQ-ACK codebook.

Condition 17e. The high priority HARQ-ACK codebook is the Type 1 HARQ-ACK codebook, and the UL grant that schedules the low priority PUSCH includes the UL total DAI field for the high priority HARQ-ACK codebook and the DAI value indicates $V_{T-DAI}^{UL}=1$.

Condition 18. The UE may multiplex the high priority CSI in the low priority PUSCH when one or more of the following conditions are met:

Condition 18a. The high priority CSI includes only the CSI part 1.

Condition 18b. The size of the high priority CSI is not larger than a number of bits that are preconfigured.

Condition 18c. A high priority HARQ-ACK codebook is not multiplexed in the high priority PUCCH (if the low priority PUSCH was absent).

When the high priority PUCCH is not multiplexed in the low priority PUSCH, the high priority PUCCH is prioritized to be transmitted.

Method 11: When the high priority PUCCH including the high priority HARQ-ACK codebook overlaps the low priority PUSCH in the time domain, an UL total DAI field for the high priority HARQ-ACK codebook may be included in the UL grant that schedules the low priority PUSCH, and the UE may use the UL total DAI value for determining the size of the high priority HARQ-ACK codebook for multiplexing in the low priority PUSCH.

In some implementations, the UE may determine whether the UL total DAI field for the high priority HARQ-ACK codebook is included in the UL grant that schedules the low priority PUSCH according to an IE (e.g., TotalDAIforHPU-CIonLPPUSCH, in PhysicalCellGroupConfig or in PUSCH- Config). In some implementations, the number of bits is 1 if the high priority HARQ-ACK codebook is the Type 1 HARQ-ACK codebook, and the number of bits is 2 for TB-based sub-codebook and the number of bits is 2 for the CBG based sub-codebook (if PDSCH-CodeBlockGroup-Transmission is configured for the high priority HARQ-ACK codebook) if the high priority HARQ-ACK codebook is the Type 2 HARQ-ACK codebook. In some implementations, the UL total DAI field for the CBG based sub-codebook is not included in the UL grant. In some implementations, the number of bits for the UL total DAI field for each sub-codebook may be 1 bit, and the DAI value of 1 indicates the UE to multiplex the high priority HARQ-ACK (sub-)codebook in the low priority PUSCH, when the DAI value of 0 indicates the UE not to multiplex the high priority HARQ-ACK (sub-)codebook in the low priority PUSCH.

In some implementations, when the UL total DAI field for the high priority HARQ-ACK codebook is not included in the UL grant that schedules the low priority PUSCH, the UE may determine the UL total DAI value for the high priority HARQ-ACK codebook based on the UL total DAI field for the low priority HARQ-ACK codebook, when the high priority HARQ-ACK codebook is multiplexed in the low priority PUSCH and the low priority HARQ-ACK codebook is not multiplexed in the low priority PUSCH. In some implementations, the UE may determine the UL total DAI value for the high priority HARQ-ACK codebook based on the UL total DAI field for the low priority HARQ-ACK codebook, regardless of the low priority HARQ-ACK codebook multiplexed in the low priority PUSCH or not.

In some implementations, when the UL total DAI field for the high priority HARQ-ACK CBG based sub-codebook is not included in the UL grant that schedules the low priority PUSCH, the UE may determine the UL total DAI value for the high priority HARQ-ACK CBG based sub-codebook based on the UL total DAI field for the low priority HARQ-ACK CBG based sub-codebook, regardless of the low priority HARQ-ACK CBG based sub-codebook multiplexed in the low priority PUSCH or not.

The following method may be used to determine the number of available resource elements and a threshold of the number of available resource elements for multiplexing the high priority UCIs in the low priority PUSCH.

Method 12: When the high priority PUCCH and the low priority PUCCH overlap the low priority PUSCH, the UE may perform the rate matching for the UCIs of the low priority PUCCH for multiplexing in the low priority PUSCH based on the beta offsets and the scaling factor of UCIs of the low priority when the UCIs of the low priority PUCCH is multiplexed in the low priority PUSCH (e.g., $\beta_{offset}^{LP\,HARQ-ACK,LP\,PUSCH}$, $\beta_{offset}^{LP\,CSI-1,LP\,PUSCH}$, $\beta_{offset}^{LP\,CSI-2,LP\,PUSCH}$, and $\alpha_{LP-PUSCH}^{LP}$).

For example, the UE may calculate the number of resource elements for multiplexing the low priority HARQ-ACK codebook, $Q'_{LP\,ACK}$ according to the equation:

$$Q'_{LP\,ACK} = \min\left\{\left\lceil\frac{(O_{LP\,ACK} + L_{LP\,ACK}) \cdot \beta_{offset}^{LP\,HARQ-ACK,LP\,PUSCH}}{\sum_{r=0}^{C_{UL-SCH}-1} K_r} \cdot \sum_{l=0}^{N_{symb,all}^{PUSCH}-1} M_{sc}^{UCI}(l)\right\rceil, \left\lceil\alpha_{LP-PUSCH}^{LP} \cdot \sum_{l=l'_0}^{N_{symb,all}^{PUSCH}-1} M_{sc}^{UCI}(l)\right\rceil\right\},$$

where $O_{LP\,ACK}$ is the payload size of the low priority HARQ-ACK codebook, and $L_{LP\,ACK}$ is the size of the CRC of the low priority HARQ-ACK codebook, and $N_{symb,all}^{PUSCH}$, $M_{SC}^{UCI}(l)$, $C_{UL-SCH}$, and $K_r$ are defined in the 3GPP TS 38.212 V16.3.0, and $l'_0$ may be preconfigured or predefined (e.g., $l'_0$ may be the OFDM symbol index of the first OFDM symbol after the first set of consecutive OFDM symbol(s) carrying DMRS in the second hop of the low priority PUSCH). $l'_0$ may be the same as $l_0$, where $l_0$ is the OFDM symbol index of the first OFDM symbol after the first set of consecutive OFDM symbol(s) carrying DMRS. The remaining number of resource elements available for multiplexing high priority UCIs and low priority UCIs in the low priority PUSCH may be determined as $$\left\lceil\alpha_{LP-PUSCH}^{HP} \cdot \sum_{l=0}^{N_{symb,all}^{PUSCH}-1} M_{sc}^{UCI}(l)\right\rceil - Q'_{LP\,ACK}.$$

If no low priority CSI is multiplexed in the low priority PUSCH, but the high priority HARQ-ACK codebook is multiplexed in the low priority PUSCH, the UE may map the high priority HARQ-ACK codebook to the resource elements that are not used for mapping the low priority HARQ-ACK codebook in symbols starting at symbol $l_0$. In some implementations, the UE may map the high priority HARQ-ACK codebook first in symbols starting at symbol $l_0$ before the low priority HARQ-ACK codebook is mapped. The UE may determine whether to multiplex the high priority HARQ-ACK codebook in the low priority PUSCH according to a minimum number of resource elements that are calculated according to the equation:

$$Q'_{HP\,ACK,min} = \min\left\{\left\lceil\frac{(O_{HP\,ACK} + L_{HP\,ACK}) \cdot \beta_{offset}^{HP\,HARQ-ACK,LP\,PUSCH}}{\sum_{r=0}^{C_{UL-SCH}-1} K_r} \cdot \sum_{l=0}^{N_{symb,all}^{PUSCH}-1} M_{sc}^{UCI}(l)\right\rceil,\right.$$

-continued $$\left. \alpha_{LP-PUSCH}^{HP} \cdot \sum_{l=l_0}^{N_{symb,all}^{PUSCH}-1} M_{sc}^{UCI}(l) \right] \right\}.$$

In some implementations, $$Q'_{HP\,ACK,min} = \left\lceil \frac{(O_{HP\,ACK} + L_{HP\,ACK}) \cdot \beta_{offset}^{HP\,HARQ-ACK,LP\,PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil.$$

If $Q'_{HP\,ACK,min}$ is larger than $$\left[ \alpha_{LP-PUSCH}^{HP} \cdot \sum_{l=l_0}^{N_{symb,all}^{PUSCH}-1} M_{sc}^{UCI}(l) \right] - Q'_{LP\,ACK},$$

the UE does not multiplex the high priority HARQ-ACK codebook in the low priority PUSCH. In some implementations, if $Q'_{HP\,ACK,min}$ is larger than $$\left[ \alpha_{LP-PUSCH}^{HP} \cdot \sum_{l=l_0}^{N_{symb,all}^{PUSCH}-1} M_{sc}^{UCI}(l) \right],$$

the UE does not multiplex the high priority HARQ-ACK codebook in the low priority PUSCH. Otherwise, the UE multiplexes the high priority HARQ-ACK codebook in the low priority PUSCH, but does not multiplex the low priority HARQ-ACK codebook in the low priority PUSCH. Alternatively, when the high priority HARQ-ACK codebook is multiplexed in the low priority PUSCH, the UE may calculate the number of resource elements for multiplexing the low priority HARQ-ACK codebook, $Q'_{LP\,ACK}$ according to the equation:

$$Q'_{LP\,ACK} = \min\left\{ \left\lceil \frac{(O_{LP\,ACK} + L_{LP\,ACK}) \cdot \beta_{offset}^{LP\,HARQ-ACK,LP\,PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[ \alpha_{LP-PUSCH}^{LP} \cdot \sum_{l=l_0}^{N_{symb,all}^{PUSCH}-1} M_{sc}^{UCI}(l) \right] \right\}.$$

In some implementations, when the number of bits for the high priority HARQ-ACK codebook is less than or equal to the predefined or preconfigured number of bits (e.g., 2 bits), a number of resource elements, $RE_{rvd,HP}$, may be reserved for the high priority HARQ-ACK codebook, $$RE_{rvd,HP} = \min\left\{ \left\lceil \frac{(O_{HP\,ACK,rvd} + L_{HP\,ACK,rvd}) \cdot \beta_{offset}^{HP\,HARQ-ACK,LP\,PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[ \alpha_{LP-PUSCH}^{HP} \cdot \sum_{l=l_0}^{N_{symb,all}^{PUSCH}-1} M_{sc}^{UCI}(l) \right] \right\},$$

where $O_{HP\,ACK,rvd}$ is the preconfigured or predefined payload size and $L_{HP\,ACK,rvd}$ is the size of the CRC for the preconfigured or predefined payload size, and the high priority HARQ-ACK codebook is mapped to a subset or all of the reserved resource elements. On the other hand, if the low priority CSI is multiplexed in the low priority PUSCH, the UE may calculate the number of resource elements for multiplexing the low priority CSI part 1, $Q'_{LP\,CSI-1}$ according to the equation:

$$Q'_{LP\,CSI-1} = \min\left\{ \left\lceil \frac{(O_{LP\,CSI-1} + L_{LP\,CSI-1}) \cdot \beta_{offset}^{LP\,CSI-1,LP\,PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left[ \alpha_{LP-PUSCH}^{LP} \cdot \sum_{l=l_0}^{N_{symb,all}^{PUSCH}-1} M_{sc}^{UCI}(l) \right] - Q'_{LP\,ACK} \right\}.$$

If $Q'_{HP\,ACK,min}$ is larger than $$\left[ \alpha_{LP-PUSCH}^{HP} \cdot \sum_{l=l_0}^{N_{symb,all}^{PUSCH}-1} M_{sc}^{UCI}(l) \right] - Q'_{LP\,ACK} - Q'_{LP\,CSI-1},$$

the UE does not multiplex the high priority HARQ-ACK codebook in the low priority PUSCH. In some implementations, the UE may omit the number of CSI part 1 reports until $Q'_{HP\,ACK,min}$ is larger than $$\left[ \alpha_{LP-PUSCH}^{HP} \cdot \sum_{l=l_0}^{N_{symb,all}^{PUSCH}-1} M_{sc}^{UCI}(l) \right] - Q'_{LP\,ACK} - Q'_{LP\,CSI-1},$$

and more specifically, the UE omits the CSI part 1 reports in the order of descending priority values. In other words, the UE omits the CSI part 1 report with the highest priority value first, if needed. In some implementations, if $Q'_{HP\ ACK,min}$ is smaller than or equal to $$\left[\alpha^{HP}_{LP-PUSCH} \cdot \sum_{l=l_0}^{N^{PUSCH}_{symb,all}-1} M^{UCI}_{sc}(l)\right] - Q'_{LPACK},$$

the UE may omit the low priority CSI part 1, and multiplex the high priority HARQ-ACK codebook in the low priority PUSCH. In some implementations, if $Q'_{HP\ ACK,min}$ is smaller than or equal to $$\left[\alpha^{HP}_{LP-PUSCH} \cdot \sum_{l=l_0}^{N^{PUSCH}_{symb,all}-1} M^{UCI}_{sc}(l)\right],$$

the UE may omit the low priority HARQ-ACK codebook and the low priority CSI part 1, and multiplex the high priority HARQ-ACK codebook in the low priority PUSCH. In some implementations, when the number of bits for the high priority HARQ-ACK codebook is less than or equal to the predefined or preconfigured number of bits (e.g. 2 bits), the UE may reserve the number of resource elements for the high priority HARQ-ACK codebook, and the UE may map the low priority CSI part 1 to the reserved resource elements before the low priority CSI part 1 is punctured by the high priority HARQ-ACK codebook.

In some implementations, if the low priority CSI part 2 is multiplexed in the low priority PUSCH, the UE may omit the number of CSI part 2 reports, to provide some resource elements for multiplexing the high priority HARQ-ACK codebook. The number of CSI part 2 reports may be preconfigured, or may be determined based on a CSI report priority value specified in Clause 5.2.5 of the 3GPP TS 38.214. For example, if the CSI part 2 report is a report with the priority value higher than a preconfigured or predefined threshold, the UE may omit the CSI part 2 report when the high priority HARQ-ACK codebook is multiplexed in the low priority PUSCH. When there is low priority CSI part 2, the UE may calculate the number of resource elements for multiplexing the low priority CSI part 2, $Q'_{LP\ CSI-2}$ according to the equation:

$$Q'_{LPCSI-2} = \min\left\{ \left\lceil \frac{(O_{LP\ CSI-2} + L_{LP\ CSI-2}) \cdot \beta^{LPCSI-2,LP\ PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \right.$$

$$\left. \left[\alpha^{LP}_{LP-PUSCH} \cdot \sum_{l=0}^{N^{PUSCH}_{symb,all}-1} M^{UCI}_{sc}(l)\right] - Q'_{LPACK} - Q'_{LP\ CSI-1} \right\}$$

If $Q'_{HP\ ACK,min}$ is larger than $$\left[\alpha^{HP}_{LP-PUSCH} \cdot \sum_{l=l_0}^{N^{PUSCH}_{symb,all}-1} M^{UCI}_{sc}(l)\right] - Q'_{LPACK} - Q'_{LP\ CSI-1} - Q'_{LP\ CSI-2},$$

the UE does not multiplex the high priority HARQ-ACK codebook in the low priority PUSCH. In some implementations, the UE may omit the CSI part 2 reports in descending order of priority value from the CSI part 2 report with the highest priority value until the number of resource elements available for multiplexing the high priority HARQ-ACK codebook is equal to or larger than $Q'_{HP\ ACK,min}$. In some implementations, if $Q'_{HP\ ACK,min}$ is smaller than or equal to $$\left[\alpha^{HP}_{LP-PUSCH} \cdot \sum_{l=l_0}^{N^{PUSCH}_{symb,all}-1} M^{UCI}_{sc}(l)\right] - Q'_{LPACK} - Q'_{LP\ CSI-1},$$

the UE may omit the low priority CSI part 2, and multiplex the high priority HARQ-ACK codebook in the low priority PUSCH. In some implementations, the UE may omit the number of CSI part 1 reports until $Q'_{HP\ ACK,min}$ is larger than $$\left[\alpha^{HP}_{LP-PUSCH} \cdot \sum_{l=l_0}^{N^{PUSCH}_{symb,all}-1} M^{UCI}_{sc}(l)\right] - Q'_{LPACK} - Q'_{LP\ CSI-1},$$

and more specifically, the UE omits the CSI part 1 reports in the order of descending priority values. In other words, the UE omits the CSI part 1 report with highest priority value first, if needed. In one implementation, if $Q'_{HP\ ACK,min}$ is smaller than or equal to $$\left[\alpha^{HP}_{LP-PUSCH} \cdot \sum_{l=l_0}^{N^{PUSCH}_{symb,all}-1} M^{UCI}_{sc}(l)\right] - Q'_{LPACK},$$

the UE may omit the low priority CSI part 1, and multiplex the high priority HARQ-ACK codebook in the low priority PUSCH. In some implementations, if $Q'_{HP\ ACK,min}$ is smaller than or equal to $$\left[\alpha^{HP}_{LP-PUSCH} \cdot \sum_{l=l_0}^{N^{PUSCH}_{symb,all}-1} M^{UCI}_{sc}(l)\right],$$

the UE may omit the low priority HARQ-ACK codebook and the low priority CSI part 1, and multiplex the high priority HARQ-ACK codebook in the low priority PUSCH.

In some implementations, when the number of resource elements is not enough for multiplexing the high priority HARQ-ACK codebook, the UE may compress the low priority HARQ-ACK codebook according to the methods for HARQ-ACK codebook compression disclosed below.

In some implementations, when the number of resource elements is not enough for multiplexing the high priority HARQ-ACK codebook, the UE may omit the HARQ-ACK bits in the low priority HARQ-ACK codebook corresponding to dynamically-scheduled PDSCH receptions. Alternatively, the UE may omit the HARQ-ACK bits in the low priority HARQ-ACK codebook corresponding to SPS PDSCH receptions.

It is noted that in the above implementations, the UE calculates the number of resource elements needed for mapping low priority UCIs first, and then checks the remaining number of resource elements to determine whether to multiplex the high priority HARQ-ACK codebook. In some implementations, the UE calculates the number of resource elements needed for mapping high priority HARQ-ACK codebook first, and then checks the remaining number of resource elements to determine whether to multiplex the low priority UCIs.

It is noted that, when the high priority HARQ-ACK codebook is determined not to multiplex in the low priority PUSCH, the high priority PUCCH carrying the high priority HARQ-ACK codebook is prioritized to be transmitted.

Low Priority PUSCH Without UL-SCH

In some implementations, when the low priority PUSCH does not include UL-SCH, the UE may calculate the number of resource elements for multiplexing the low priority HARQ-ACK codebook, $Q'_{LP\ ACK}$ according to the equation:

$$Q'_{LP\ ACK} = \min\left\{\left\lceil\frac{(O_{LP\ ACK} + L_{LP\ ACK}) \cdot \beta_{offset}^{LP\ HARQ-ACK,LP\ PUSCH}}{R \cdot Q_m}\right\rceil,\right.$$
$$\left.\left\lceil\alpha_{LP-PUSCH}^{LP} \cdot \sum_{l=l'_0}^{N_{symb,all}^{PUSCH}-1} M_{sc}^{UCI}(l)\right\rceil\right\},$$

where R is the code rate of the high priority PUSCH, $Q_m$ is the modulation order of the high priority PUSCH, and $l'_0$ may be preconfigured or predefined (e.g., $l'_0$ may be the OFDM symbol index of the first OFDM symbol after the first set of consecutive OFDM symbol(s) carrying DMRS in the second hop of the low priority PUSCH). $l'_0$ may be the same as $l_0$, where $l_0$ is the OFDM symbol index of the first OFDM symbol after the first set of consecutive OFDM symbol(s) carrying DMRS. The UE may map the high priority HARQ-ACK codebook to the resource elements that not used for mapping the low priority HARQ-ACK codebook in symbols starting at symbol $l_0$. In some implementations, the UE may map the high priority HARQ-ACK codebook first in symbols starting at symbol $l_0$ before the low priority HARQ-ACK codebook is mapped. The UE may map the low priority aperiodic CSI to the resource elements that are not used for mapping the high priority HARQ-ACK codebook and the low priority HARQ-ACK codebook in symbols starting at symbol 0. The UE may calculate the number of resource elements for multiplexing the low priority CSI part 1, $Q'_{LP\ CSI-1}$ according to the equation:

$$Q'_{LP\ CSI-1} = \min\left\{\left\lceil\frac{(O_{LP\ CSI-1} + L_{LP\ CSI-1}) \cdot \beta_{offset}^{LP\ CSI-1,LP\ PUSCH}}{R \cdot Q_m}\right\rceil,\right.$$
$$\left.\sum_{l=0}^{N_{symb,all}^{PUSCH}-1} M_{sc}^{UCI}(l) - Q'_{LP\ ACK}\right\}.$$

The remaining number of resource elements available for multiplexing the high priority UCIs and the low priority UCIs in the low priority PUSCH may be determined as $$\left\lceil\alpha_{LP-PUSCH}^{HP} \cdot \sum_{l=0}^{N_{symb,all}^{PUSCH}-1} M_{sc}^{UCI}(l)\right\rceil - Q'_{LP\ ACK} - Q'_{LP\ CSI-1}.$$

Then, the UE may calculate the number of available resource elements for multiplexing the high priority HARQ-ACK codebook, $Q'_{HP\ ACK}$ according to the equation:

$$Q'_{HP\ ACK} = \sum_{l=l_0}^{N_{symb,all}^{PUSCH}-1} M_{sc}^{UCI}(l) - Q'_{LP\ ACK,} - Q'_{LP\ CSI-1}.$$

In some implementations, $$Q'_{HP\ ACK} = \left\lceil\alpha_{LP-PUSCH}^{HP} \cdot \sum_{l=l_0}^{N_{symb,all}^{PUSCH}-1} M_{sc}^{UCI}(l)\right\rceil - Q'_{LP\ ACK} - Q'_{LP\ CSI-1}.$$

Accordingly, the UE may multiplex the high priority HARQ-ACK codebook in the low priority PUSCH if the code rate calculated as $(O_{HP\ ACK}+L_{HP\ ACK})/(N_L \cdot Q'_{HP\ ACK} \cdot Q_m)$ is lower than a code rate threshold. The code rate threshold may be calculated as $$\frac{R}{\beta_{offset}^{HP\ HARQ-ACK,LP\ PUSCH}}.$$

In some implementations, $$Q'_{HPACK} = \sum_{l=l_0}^{N_{symb,all}^{PUSCH}-1} M_{sc}^{UCI}(l) - Q'_{LPACK} \text{ or } Q'_{HPACK} =$$
$$\left\lceil\alpha_{LP-PUSCH}^{HP} \cdot \sum_{l=l_0}^{N_{symb,all}^{PUSCH}-1} M_{sc}^{UCI}(l)\right\rceil - Q'_{LPACK},$$

and if the high priority HARQ-ACK codebook is multiplexed in the low priority PUSCH, the UE may calculate the number of resource elements available for multiplexing the low priority CSI part 1, $Q'_{LP\ CSI-1}$ according to the equation:

$$Q'_{LPCSI-1} = \min\left\{\left\lceil\frac{(O_{LPCSI-1} + L_{LPCSI-1}) \cdot \beta_{offset}^{LPCSI-1,LPPUSCH}}{R \cdot Q_m}\right\rceil,\right.$$
$$\left.\sum_{l=0}^{N_{symb,all}^{PUSCH}-1} M_{sc}^{UCI}(l) - Q'_{LPACK} - Q'_{HPACK}\right\},$$

and then omit the number of CSI part 1 reports in descending order of priority value until the code rate calculated as $(O_{LP\ CSI-1}+L_{LP\ CSI-1})/(N_L \cdot Q'_{LP-CSI-1} \cdot Q_m)$ is lower than $$\frac{R}{\beta_{offset}^{LPCSI-1,LPPUSCH}}.$$

In some implementations, $$Q'_{HPACK} = \left\lceil \alpha^{HP}_{LP-PUSCH} \cdot \sum_{l=l_0}^{N^{PUSCH}_{symb,all}-1} M^{UCI}_{sc}(l) \right\rceil,$$

and if the high priority HARQ-ACK codebook is multiplexed in the low priority PUSCH, the UE may calculate the number of resource elements available for multiplexing the low priority CSI part 1, $Q'_{LP\ CSI-1}$, according to the equation:

$$Q'_{LPCSI-1} = \min\left\{ \left\lceil \frac{(O_{LPCSI-1} + L_{LPCSI-1}) \cdot \beta^{LPCSI-1,LPPUSCH}_{offset}}{R \cdot Q_m} \right\rceil, \right.$$
$$\left. \sum_{l=0}^{N^{PUSCH}_{symb,all}-1} M^{UCI}_{sc}(l) - Q'_{HPACK} \right\}.$$

The UE may omit the low priority HARQ-ACK codebook and may omit the number of CSI part 1 reports in descending order of priority value until the code rate calculated as $(O_{LP\ CSI-1}+L_{LP\ CSI-1})/(N_L \cdot Q'_{LP\ CSI-1} \cdot Q_m)$ is lower than $$\frac{R}{\beta^{LPCSI-1,LPPUSCH}_{offset}}.$$

In some implementations, when the number of bits for the high priority HARQ-ACK codebook is less than or equal to the predefined or preconfigured number of bits (e.g., 2 bits), a number of resource elements $RE_{rvd,HP}$ may be reserved for the high priority HARQ-ACK codebook.

$$RE_{rvd,HP} = \min\left\{ \left\lceil \frac{(O_{HPACK,rvd} + L_{HPACK,rvd}) \cdot \beta^{HPHARQ-ACK,LPPUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \right.$$
$$\left. \left\lceil \alpha^{HP}_{LP-PUSCH} \cdot \sum_{l=l_0}^{N^{PUSCH}_{symb,all}-1} M^{UCI}_{sc}(l) \right\rceil \right\},$$

where $O_{HP\ ACK,rvd}$ is the preconfigured or predefined payload size and $L_{HP\ ACK,rvd}$ is the size of the CRC for the preconfigured or predefined payload size, and the high priority HARQ-ACK codebook is mapped to a subset or all of the reserved resource elements. In some implementations, the UE may map the low priority HARQ-ACK codebook to the resource elements reserved for the high priority HARQ-ACK codebook before the low priority HARQ-ACK codebook is punctured by the high priority HARQ-ACK codebook. In this case, $Q'_{LP\ ACK}$ in the previously mentioned equation for multiplexing the high priority HARQ-ACK codebook may be subtracted by $RE_{rvd,HP,l'_0}$, where $RE_{rvd,HP,l'_0}$ is the number of reserved resource elements for the high priority HARQ-ACK codebook in symbols starting at $l'_0$. In some implementations, when the number of bits for the high priority HARQ-ACK codebook is less than or equal to the predefined or preconfigured number of bits, such as 2 bits, the UE may reserve the number of resource elements for the high priority HARQ-ACK codebook, and map the low priority CSI part 1 to the reserved resource elements before the low priority CSI part 1 is punctured by the high priority HARQ-ACK codebook.

In some implementations, if the low priority CSI part 2 is multiplexed in the low priority PUSCH, the UE may omit the number of CSI part 2 reports, to provide some resource elements for multiplexing the high priority HARQ-ACK codebook. The number of CSI part 2 reports may be preconfigured, or may be determined based on the CSI report priority value specified in Clause 5.2.5 in the 3GPP TS 38.214. For example, if the CSI part 2 report is a report with the priority value higher than the preconfigured or predefined threshold, the UE may omit the CSI part 2 report when the high priority HARQ-ACK codebook is multiplexed in the low priority PUSCH. When there is low priority CSI part 2, the UE may calculate the number of resource elements for multiplexing the low priority CSI part 2, $Q'_{LP\ CSI-2}$ according to the equation:

$$Q'_{LPCSI-2} = \min\left\{ \left\lceil \frac{(O_{LPCSI-2} + L_{LPCSI-2}) \cdot \beta^{LPCSI-2,LPPUSCH}_{offset}}{R \cdot Q_m} \right\rceil, \right.$$
$$\left. \sum_{l=0}^{N^{PUSCH}_{symb,all}-1} M^{UCI}_{sc}(l) - Q'_{LPACK} - Q'_{LPCSI-1} \right\}.$$

Then, the UE may calculate the number of available resource elements for multiplexing the high priority HARQ-ACK codebook, $Q'_{HP\ ACK}$ according to the equation:

$$Q'_{HPACK} = \sum_{l=l_0}^{N^{PUSCH}_{symb,all}-1} M^{UCI}_{sc}(l) - Q'_{LPACK} - Q'_{LPCSI-1} - Q'_{LPCSI-2}.$$

In some implementations, $$Q'_{HPACK} = \left\lceil \alpha^{HP}_{LP-PUSCH} \cdot \sum_{l=l_0}^{N^{PUSCH}_{symb,all}-1} M^{UCI}_{sc}(l) \right\rceil - Q'_{LPACK} - Q'_{LPCSI-1} - Q'_{LPCSI-2}.$$

Accordingly, the UE may multiplex the high priority HARQ-ACK codebook in the low priority PUSCH if the code rate calculated as $(O_{HP\ ACK}+L_{HP\ ACK})/(N_L \cdot Q'_{HP\ ACK} \cdot Q_m)$ is lower than a code rate threshold. The code rate threshold may be calculated as $$\frac{R}{\beta^{HPHARQ-ACK,LPPUSCH}_{offset}}.$$

In some implementations, $$Q'_{HPACK} = \sum_{l=l_0}^{N^{PUSCH}_{symb,all}-1} M^{UCI}_{sc}(l) - Q'_{LPACK} - Q'_{LPCSI-1} \text{ or}$$

$$Q'_{HPACK} = \left\lceil \alpha^{HP}_{LP-PUSCH} \cdot \sum_{l=l_0}^{N^{PUSCH}_{symb,all}-1} M^{UCI}_{sc}(l) \right\rceil - Q'_{LPACK} - Q'_{LPCSI-1},$$

and if the high priority HARQ-ACK codebook is multiplexed in the low priority PUSCH, the UE may calculate the number of resource elements available for multiplexing the low priority CSI part 2, $Q'_{LP\ CSI-2}$ according to the equation:

$$Q'_{LPCSI-2} = \min\left\{ \left\lceil \frac{(O_{LPCSI-2} + L_{LPCSI-2}) \cdot \beta_{offset}^{LPCSI-2,LPPUSCH}}{R \cdot Q_m} \right\rceil, \right.$$

$$\left. \sum_{l=0}^{N_{symb,all}^{PUSCH}-1} M_{sc}^{UCI}(l) - Q'_{LPACK} - Q'_{HPACK} - Q'_{LPCSI-1} \right\},$$

and then omit the number of CSI part 2 reports in descending order of priority value until the code rate calculated as $(O_{LP\ CSI-2}+L_{LP\ CSI-2})/(N_L \cdot Q'_{LP\ CSI-2} \cdot Q_m)$ is lower than $$\frac{R}{\beta_{offset}^{LPCSI-2,LPPUSCH}}.$$

In some implementations, $$Q'_{HPACK} = \sum_{l=l_0}^{N_{symb,all}^{PUSCH}-1} M_{sc}^{UCI}(l) - Q'_{LPACK} \text{ or}$$

$$Q'_{HPACK} = \left\lceil \alpha_{LP-PUSCH}^{HP} \cdot \sum_{l=l_0}^{N_{symb,all}^{PUSCH}-1} M_{sc}^{UCI}(l) \right\rceil - Q'_{LPACK},$$

and if the high priority HARQ-ACK codebook is multiplexed in the low priority PUSCH, the UE may calculate the number of resource elements available for multiplexing the low priority CSI part 1, $Q_{LP\ CSI-1}$ according to the equation:

$$Q'_{LPCSI-1} = \min\left\{ \left\lceil \frac{(O_{LPCSI-1} + L_{LPCSI-1}) \cdot \beta_{offset}^{LPCSI-1,LPPUSCH}}{R \cdot Q_m} \right\rceil, \right.$$

$$\left. \sum_{l=0}^{N_{symb,all}^{PUSCH}-1} M_{sc}^{UCI}(l) - Q'_{LPACK} - Q'_{HPACK} \right\},$$

and then omit the number of CSI part 1 reports in descending order of priority value until the code rate calculated as $(O_{LP\ CSI-1}+L_{LP\ CSI-1})/(N_L \cdot Q'_{LP\ CSI-1} \cdot Q_m)$ is lower than $$\frac{R}{\beta_{offset}^{LPCSI-1,LPPUSCH}}.$$

In some implementations, $$Q'_{HPACK} = \left\lceil \alpha_{LP-PUSCH}^{HP} \cdot \sum_{l=l_0}^{N_{symb,all}^{PUSCH}-1} M_{sc}^{UCI}(l) \right\rceil,$$

and if the high priority HARQ-ACK codebook is multiplexed in the low priority PUSCH, the UE may calculate the number of resource elements available for multiplexing the low priority CSI part 1, $Q'_{LP\ CSI-1}$ according to the equation:

$$Q'_{LPCSI-1} = \min\left\{ \left\lceil \frac{(O_{LPCSI-1} + L_{LPCSI-1}) \cdot \beta_{offset}^{LPCSI-1,LPPUSCH}}{R \cdot Q_m} \right\rceil, \right.$$

$$\left. \sum_{l=0}^{N_{symb,all}^{PUSCH}-1} M_{sc}^{UCI}(l) - Q'_{HPACK} \right\},$$

and then omit the low priority HARQ-ACK codebook and the number of CSI part 1 reports in descending order of priority value until the code rate calculated as $(O_{LP\ CSI-1}+L_{LP\ CSI-1})/(N_L \cdot Q'_{LP\ CSI-1} \cdot Q_m)$ is lower than $$\frac{R}{\beta_{offset}^{LPCSI-1,LPPUSCH}}.$$

In some implementations, when the number of resource elements available for multiplexing the high priority HARQ-ACK codebook results in a code rate lower than $(O_{HP\ ACK}+L_{HP\ ACK})/(N_L \cdot Q'_{HP\ ACK} \cdot Q_m)$, the UE may compress the low priority HARQ-ACK codebook according to the methods for HARQ-ACK codebook compression disclosed below.

In some implementations, when the number of resource elements available for multiplexing the high priority HARQ-ACK codebook results in a code rate lower than $(O_{HP\ ACK}+L_{HP\ ACK})/(N_L \cdot Q'_{HP\ ACK} \cdot Q_m)$, the UE may omit the HARQ-ACK bits in the low priority HARQ-ACK codebook corresponding to dynamically-scheduled PDSCH receptions. Alternatively, the UE may omit the HARQ-ACK bits in the low priority HARQ-ACK codebook corresponding to SPS PDSCH receptions.

It is noted that in the above implementations, the UE calculates the number of resource elements needed for mapping low priority UCIs first, and then checks the remaining number of resource elements to determine whether to multiplex the high priority HARQ-ACK codebook. In some implementations, the UE calculates the number of resource elements needed for mapping high priority HARQ-ACK codebook first, and then checks the remaining number of resource elements to determine whether to multiplex the low priority UCIs.

It is noted that, when the UE determines not to multiplex the high priority HARQ-ACK codebook in the low priority PUSCH, the UE may prioritize the high priority PUCCH carrying the high priority HARQ-ACK codebook for transmission.

In some implementations, when the low priority PUSCH is a CG PUSCH with CG-UCI, the UE may prepend the CG-UCI to the low priority HARQ-ACK codebook bits, if the low priority HARQ-ACK codebook bits are multiplexed in the low priority PUSCH. In this case, the $O_{LP\ ACK}$ may be the total payload size of the CG-UCI and the low priority HARQ-ACK codebook. When the UE determines not to multiplex the CG-UCI and the low priority HARQ-ACK codebook in the low priority PUSCH, the UE does not transmit the low priority PUSCH. If no low priority HARQ-ACK codebook bit is multiplexed in the low priority PUSCH, the UE may determine the CG-UCI as the low priority HARQ-ACK codebook and $O_{LP\ ACK}$ may be the total payload size of the CG-UCI. When the UE determines not to multiplex the CG-UCI in the low priority PUSCH, the UE may not transmit the low priority PUSCH. In some implementations, when no low priority HARQ-ACK codebook bit is multiplexed in the low priority PUSCH, and the high priority HARQ-ACK codebook bits are multiplexed in the low priority PUSCH, the UE may prepend the CG-UCI to the high priority HARQ-ACK codebook bits. In this case, the $O_{HP\ ACK}$ may be the total payload size of the CG-UCI and the high priority HARQ-ACK codebook.

The following method may be used to compress the size of the low priority HARQ-ACK codebook when the low priority HARQ-ACK codebook is multiplexed in the low priority PUSCH.

Method 13: Spatial bundling parameters and CBG parameters may be separately configured for the low priority HARQ-ACK codebook when the low priority HARQ-ACK codebook is multiplexed in the high priority PUSCH and for the low priority HARQ-ACK codebook when the low priority HARQ-ACK codebook is multiplexed in the low priority PUSCH.

In some implementations, harq-ACK-SpatialBundling-HPPUSCH may be configured in PhysicalCellGroupConfig to instruct the UE to perform the spatial bundling for the low priority HARQ-ACK codebook when the low priority HARQ-ACK codebook is multiplexed in the high priority PUSCH, and harq-ACK-SpatialBundlingPUSCH may be configured in PhysicalCellGroupConfig to instruct the UE to perform the spatial bundling for the low priority HARQ-ACK codebook when the low priority HARQ-ACK codebook is multiplexed in the low priority PUSCH. In some implementations, when harq-ACK-SpatialBundlingPUSCH is configured, the UE may perform the spatial bundling for the low priority HARQ-ACK codebook when the low priority HARQ-ACK codebook is multiplexed in the high priority PUSCH.

In some implementations, harq-ACK-TBHPPUSCH may be configured in PhysicalCellGroupConfig or in PUSCH-Config to instruct the UE to compress the CBG based HARQ-ACK codebook. In some implementations, if the low priority HARQ-ACK codebook is the Type-1 HARQ-ACK codebook, the UE transmits only HARQ-ACK bits for the TBs in the PDSCHs corresponding to the low priority HARQ-ACK codebook when the low priority HARQ-ACK codebook is multiplexed in the high priority PUSCH. In some implementations, if the low priority HARQ-ACK codebook is the Type-2 HARQ-ACK codebook, the UE transmits only the TB-based sub-codebook of the low priority HARQ-ACK codebook when the low priority HARQ-ACK codebook is multiplexed in the high priority PUSCH. In some implementations, if the low priority HARQ-ACK codebook is the Type-2 HARQ-ACK codebook, the UE transmits the TB-based sub-codebook of the low priority HARQ-ACK codebook, and the HARQ-ACK bits for the TBs in the PDSCHs corresponding to the CBG based sub-codebook of the low priority HARQ-ACK codebook when the low priority HARQ-ACK codebook is multiplexed in the high priority PUSCH.

In some implementations, the parameters (e.g., harq-ACK-SpatialBundlingHPPUSCH and harq-ACK-TBHP-PUSCH) applicable for the low priority HARQ-ACK codebook when the low priority HARQ-ACK codebook is multiplexed in the high priority PUSCH, may also be applied by the UE when the low priority HARQ-ACK codebook is multiplexed in the low priority PUSCH in which the high priority UCIs are multiplexed.

Figure 5:
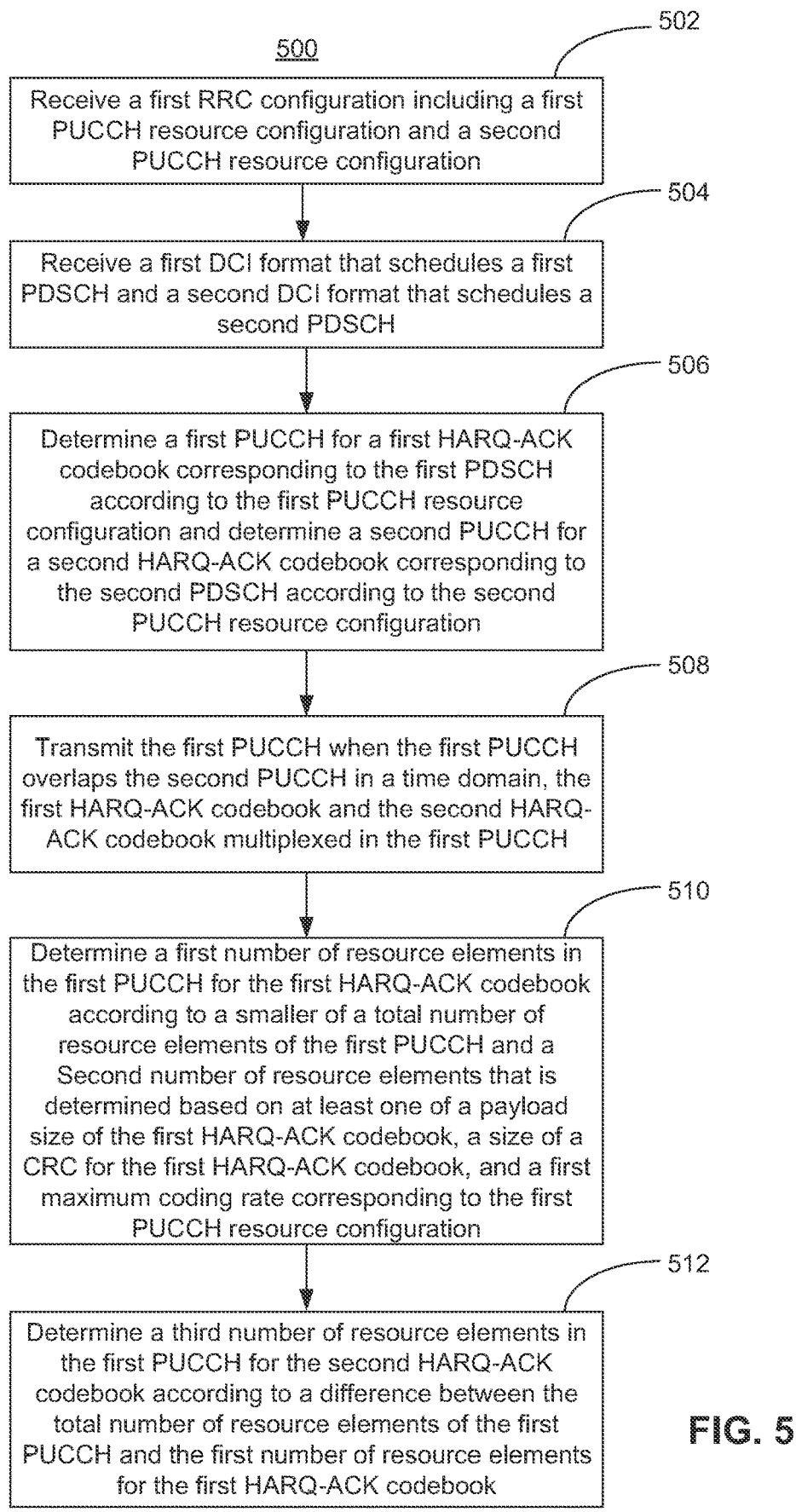
FIG. 5 is a flowchart illustrating a method of transmitting a PUCCH, according to an implementation of the present disclosure.

FIG. 5 is a flowchart illustrating a method 500 of transmitting a PUCCH, according to an implementation of the present disclosure. In action 502, the UE receives a first RRC configuration including a first PUCCH resource configuration and a second PUCCH resource configuration. In action 504, the UE receives a first DCI format that schedules a first PDSCH and a second DCI format that schedules a second PDSCH. In action 506, the UE determines a first PUCCH for a first HARQ-ACK codebook corresponding to the first PDSCH according to the first PUCCH resource configuration and determines a second PUCCH for a second HARQ-ACK codebook corresponding to the second PDSCH according to the second PUCCH resource configuration. In action 508, the UE transmits the first PUCCH when the first PUCCH overlaps the second PUCCH in a time domain, the first HARQ-ACK codebook and the second HARQ-ACK codebook multiplexed in the first PUCCH. In action 510, the UE determines a first number of resource elements (e.g., $E_{HP\_UCI}$) in the first PUCCH for the first HARQ-ACK codebook according to a smaller of a total number of resource elements (e.g., $E_{tot,HP}$) of the first PUCCH and a second number of resource elements that is determined based on at least one of a payload size of the first HARQ-ACK codebook (e.g., $O_{HP\_ACK}$), a size of a CRC for the first HARQ-ACK codebook (e.g., $L_{HP\_UCI}$), and a first maximum coding rate (e.g., $r_{HP}$) corresponding to the first PUCCH resource configuration. In action 512, the UE determines a third number of resource elements (e.g., $E_{tot,HP} - E_{HP\_UCI}$) in the first PUCCH for the second HARQ-ACK codebook according to a difference between the total number of resource elements of the first PUCCH and the first number of resource elements for the first HARQ-ACK codebook.

In some examples, the first number of resource elements for the first HARQ-ACK codebook is the minimum of the total number of resource elements of the first PUCCH, and the second number of resource elements determined based on at least one of a payload size (e.g., $O_{HP\_SR}$) of a scheduling request of a first priority that is indicated by the first DCI format and the payload size of the first HARQ-ACK codebook, a size of a CRC for the scheduling request and the size of the CRC for the first HARQ-ACK codebook, and the first maximum coding rate.

In some examples, the UE may receive a second RRC configuration including a first set of offset values (e.g., beta offsets) and a second set of offset values (e.g., beta offsets) and receive a third DCI format that schedules a first PUSCH of a first priority that is indicated by the third DCI format. The UE may transmit the first PUSCH, but not transmit the first PUCCH when the first PUSCH overlaps the first PUCCH in the time domain, where the first HARQ-ACK codebook and the second HARQ-ACK codebook are multiplexed in the first PUSCH. The UE determines a fourth number of resource elements in the first PUSCH for the first HARQ-ACK codebook based on the first set of offset values and a first value (e.g., beta offset indicator) of a field in the third DCI format, where the first value is used for indicating an offset value of the first set of offset values, and the UE determines a fifth number of resource elements in the first PUSCH for the second HARQ-ACK codebook based on the second set of offset values and a second value of the field in the third DCI format, where the second value is used for indicating an offset value of the second set of offset values.

In some examples, the UE may receive the second RRC configuration including a third set of offset values and a fourth set of offset values and receive a fourth DCI format that schedules a second PUSCH of a second priority that is indicated by the fourth DCI format. The UE may transmit the second PUSCH but not transmit the first PUCCH when the second PUSCH overlaps the first PUCCH in the time domain and the first PUSCH does not overlap the first PUCCH and the second PUSCH in the time domain, where the first HARQ-ACK codebook and the second HARQ-ACK codebook are multiplexed in the second PUSCH. The UE determines a sixth number of resource elements in the second PUSCH for the first HARQ-ACK codebook based on the third set of offset values and a third value of a field in the fourth DCI format, where the third value is used for indicating an offset value of the third set of offset values, and the UE determines a seventh number of resource elements in the second PUSCH for the second HARQ-ACK codebook based on the fourth set of offset values and a fourth value of the field in the fourth DCI format, where the fourth value is used for indicating an offset value of the fourth set of offset values.

In some examples, the UE may determine a number of PRBs of the first PUCCH based on at least one of the payload size of the first HARQ-ACK codebook, a payload size of the second HARQ-ACK codebook, the first maximum coding rate, and a second maximum coding rate (e.g., $r_{LP}$) that corresponds to the second PUCCH resource configuration.

Figure 6:
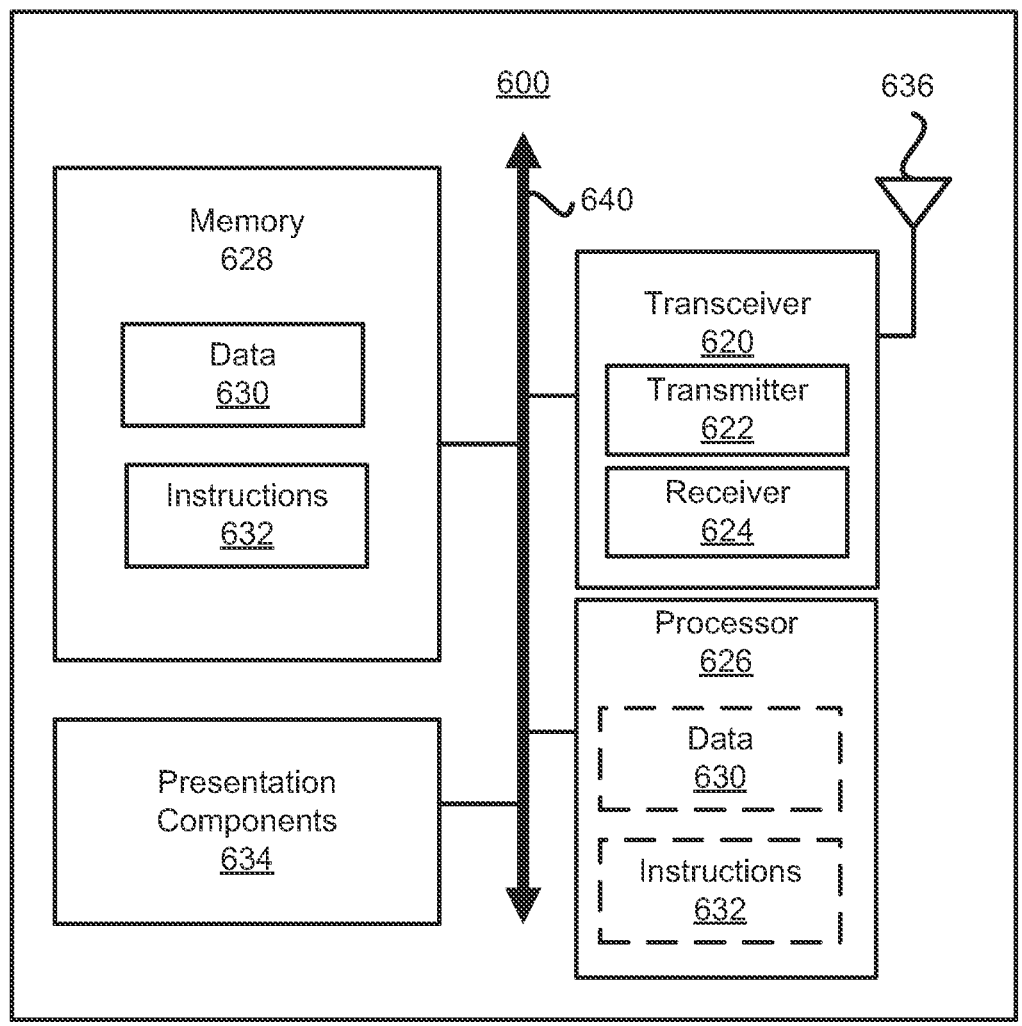
FIG. 6 is a block diagram illustrating a node for wireless communication, according to an implementation of the present disclosure.

FIG. 6 is a block diagram illustrating a node 600 for wireless communication, according to an implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, a system communications management module, input/output (I/O) ports, I/O components, and a power supply (not illustrated in FIG. 6).

Each of these components may be in communication with each other, directly or indirectly, over one or more buses 640. The node 600 may be a UE or a BS that performs various disclosed functions illustrated in FIG. 5 and examples/implementations in this disclosure.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device, a central processing unit (CPU), a microcontroller, an ASIC, etc. The processor 626 may include memory. The processor 626 may process the data 630 and the instructions 632 received from the memory 628, and information received through the transceiver 620, the baseband communications module, and/or the network communications module. The processor 626 may also process information sent to the transceiver 620 for transmission via the antenna 636, and/or to the network communications module for transmission to a CN.

One or more presentation components 634 may present data to a person or other devices. Presentation components 634 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of transmitting a Physical Uplink Control Channel (PUCCH) for a user equipment (UE), the method comprising:
receiving a first Radio Resource Control (RRC) configuration including a first PUCCH resource configuration and a second PUCCH resource configuration;
receiving a first Downlink Control Information (DCI) format that schedules a first Physical Downlink Shared Channel (PDSCH) and a second DCI format that schedules a second PDSCH;
determining a first PUCCH for a first Hybrid Automatic Repeat reQuest (HARQ) acknowledgement (ACK) codebook corresponding to the first PDSCH according to the first PUCCH resource configuration;
determining a second PUCCH for a second HARQ-ACK codebook corresponding to the second PDSCH according to the second PUCCH resource configuration; and
in a case that the first PUCCH overlaps the second PUCCH in time domain and the first PUCCH is a high priority PUCCH and the second PUCCH is a low priority PUCCH, performing the following:
transmitting the first PUCCH;
determining a PUCCH resource for the first PUCCH based on a total payload size of high priority Uplink Control Information (UCI) on the first PUCCH and a PUCCH resource indicator in a third DCI format that schedules the first PUCCH;

after determining the PUCCH resource for the first PUCCH, determining a number of physical resource blocks (PRBs) of the first PUCCH based on a payload size of the first HARQ-ACK codebook, a payload size of the second HARQ-ACK codebook, a first maximum coding rate, and a second maximum coding rate;

determining a first number of resource elements in the first PUCCH for multiplexing the first HARQ-ACK codebook according to a smaller of a total number of resource elements of the first PUCCH and a second number of resource elements, the total number of resource elements determined based on the number of PRBs of the first PUCCH, and the second number determined based on the payload size of the first HARQ-ACK codebook, a size of a Cyclic Redundancy Check (CRC) for the first HARQ-ACK codebook, and the first maximum coding rate corresponding to the first PUCCH resource configuration; and determining a third number of resource elements in the first PUCCH for multiplexing the second HARQ-ACK codebook according to a difference between the total number of resource elements of the first PUCCH and the first number of resource elements for multiplexing the first HARQ-ACK codebook, wherein the first HARQ-ACK codebook and the second HARQ-ACK codebook are multiplexed in the first PUCCH in a case that the difference between the total number of resource elements of the first PUCCH and the first number of resource elements is not zero.

2. The method of claim 1, further comprising:

receiving a second RRC configuration including a first set of offset values and a second set of offset values;

receiving a fourth DCI format that schedules a Physical Uplink Shared Channel (PUSCH) of a first priority, the first priority indicated by the fourth DCI format; and in a case that the PUSCH overlaps the first PUCCH and the second PUCCH in the time domain and the first priority is a high priority, performing the following:

transmitting the PUSCH and not transmitting the first PUCCH;

determining a fourth number of resource elements in the PUSCH for multiplexing the first HARQ-ACK codebook based on the first set of offset values and a first value of a field in the fourth DCI format, the first value indicating an offset value of the first set of offset values;

determining a fifth number of resource elements in the PUSCH for multiplexing the second HARQ-ACK codebook based on the second set of offset values and a second value of the field in the fourth DCI format, the second value indicating an offset value of the second set of offset values, wherein:

the first set of offset values is used for determining a number of resource elements for multiplexing high priority UCI on high priority PUSCHs, and the second set of offset values is used for determining a number of resource elements for multiplexing low priority UCI on high priority PUSCHs.

3. The method of claim 1, further comprising:

receiving a second RRC configuration including a first set of offset values and a second set of offset values;

receiving a fourth DCI format that schedules a Physical Uplink Shared Channel (PUSCH) of a first priority, the first priority indicated by the fourth DCI format; and in a case that the PUSCH overlaps the first PUCCH and the second PUCCH in the time domain and the first priority is a low priority, performing the following:

transmitting the PUSCH and not transmitting the first PUCCH;

determining a fourth number of resource elements in the PUSCH for multiplexing the second HARQ-ACK codebook based on the first set of offset values and a first value of a field in the fourth DCI format, the first value indicating an offset value of the first set of offset values; and determining a fifth number of resource elements in the PUSCH for multiplexing the first HARQ-ACK codebook based on the second set of offset values and a second value of the field in the fourth DCI format, the second value indicating an offset value of the second set of offset values, wherein:

the first set of offset values is used for determining a number of resource elements for multiplexing low priority UCI on low priority PUSCHs, and the second set of offset values is used for determining a number of resource elements for multiplexing high priority UCI on low priority PUSCHs.

4. The method of claim 1, wherein the first maximum coding rate corresponds to a PUCCH format of the first PUCCH resource configuration, and the second maximum coding rate corresponds to a PUCCH format of the second PUCCH resource configuration.

5. A user equipment (UE) for transmitting a Physical Uplink Control Channel (PUCCH), the UE comprising:

at least one processor for executing one or more computer-executable instructions; and at least one memory, coupled to the at least one processor, for storing the one or more computer-executable instructions that, when executed by the at least one processor, cause the UE to:

receive a first Radio Resource Control (RRC) configuration including a first PUCCH resource configuration and a second PUCCH resource configuration;

receive a first Downlink Control Information (DCI) format that schedules a first Physical Downlink Shared Channel (PDSCH) and a second DCI format that schedules a second PDSCH;

determine a first PUCCH for a first Hybrid Automatic Repeat Request (HARQ) acknowledgement (ACK) codebook corresponding to the first PDSCH according to the first PUCCH resource configuration;

determine a second PUCCH for a second HARQ-ACK codebook corresponding to the second PDSCH according to the second PUCCH resource configuration; and in a case that the first PUCCH overlaps the second PUCCH in time domain and the first PUCCH is a high priority PUCCH and the second PUCCH is a low priority PUCCH, perform the following:

transmit the first PUCCH;

determine a PUCCH resource for the first PUCCH based on a total payload size of high priority Uplink Control Information (UCI) on the first PUCCH and a PUCCH resource indicator in a third DCI format that schedules the first PUCCH;

after determining the PUCCH resource for the first PUCCH, determine a number of physical resource blocks (PRBs) of the first PUCCH based on a payload size of the first HARQ-ACK codebook, a payload size of the second HARQ-ACK codebook, a first maximum coding rate, and a second maximum coding rate;

determine a first number of resource elements in the first PUCCH for multiplexing the first HARQ-ACK codebook according to a smaller of a total number of resource elements of the first PUCCH and a second number of resource elements, the total number of resource elements determined based on the number of PRBs of the first PUCCH, and the second number determined based on the payload size of the first HARQ-ACK codebook, a size of a Cyclic Redundancy Check (CRC) for the first HARQ-ACK codebook, and the first maximum coding rate corresponding to the first PUCCH resource configuration; and determine a third number of resource elements in the first PUCCH for multiplexing the second HARQ-ACK codebook according to a difference between the total number of resource elements of multiplexing the first PUCCH and the first number of resource elements for the first HARQ-ACK codebook, wherein the first HARQ-ACK codebook and the second HARQ-ACK codebook are multiplexed in the first PUCCH in a case that the difference between the total number of resource elements of the first PUCCH and the first number of resource elements is not zero.

6. The UE of claim 5, wherein the one or more computer-executable instructions, when executed by the at least one processor, further cause the UE to:

receive a second RRC configuration including a first set of offset values and a second set of offset values;

receive a fourth DCI format that schedules a Physical Uplink Shared Channel (PUSCH) of a first priority, the first priority indicated by the third DCI format; and in a case that the PUSCH overlaps the first PUCCH and the second PUCCH in the time domain and the first priority is a high priority, perform the following:

transmit the PUSCH and not transmit the first PUCCH;

determine a fourth number of resource elements in the PUSCH for multiplexing the first HARQ-ACK codebook based on the first set of offset values and a first value of a field in the fourth DCI format, the first value indicating an offset value of the first set of offset values;

determine a fifth number of resource elements in the PUSCH for multiplexing the second HARQ-ACK codebook based on the second set of offset values and a second value of the field in the fourth DCI format, the second value indicating an offset value of the second set of offset values wherein:

the first set of offset values is used for determining a number of resource elements for multiplexing high priority UCI on high priority PUSCHs, and the second set of offset values is used for determining a number of resource elements for multiplexing low priority UCI on high priority PUSCHs.

7. The UE of claim 5, wherein the one or more computer-executable instructions, when executed by the at least one processor, further cause the UE to:

receive a second RRC configuration including a first set of offset values and a second set of offset values;

receive a fourth DCI format that schedules a Physical Uplink Shared Channel (PUSCH) of a first priority, the first priority indicated by the fourth DCI format; and in a case that the PUSCH overlaps the first PUCCH and the second PUCCH in the time domain and the first priority is a low priority, perform the following:

transmit the PUSCH and not transmit the first PUCCH;

determine a fourth number of resource elements in the PUSCH for multiplexing the second HARQ-ACK codebook based on the first set of offset values and a first value of a field in the fourth DCI format, the first value indicating an offset value of the first set of offset values; and determine a fifth number of resource elements in the PUSCH for multiplexing the first HARQ-ACK codebook based on the second set of offset values and a second value of the field in the fourth DCI format, the second value indicating an offset value of the second set of offset values, wherein:

the first set of offset values is used for determining a number of resource elements for multiplexing low priority UCI on low priority PUSCHs, and the second set of offset values is used for determining a number of resource elements for multiplexing high priority UCI on low priority PUSCHs.

8. The UE of claim 5, wherein the first maximum coding rate corresponds to a PUCCH format of the first PUCCH resource configuration, and the second maximum coding rate corresponds to a PUCCH format of the second PUCCH resource configuration.

* * * * *